United States Patent
Hill et al.

(10) Patent No.: US 9,652,118 B2
(45) Date of Patent: May 16, 2017

(54) SYSTEM AND METHOD FOR GENERATING A COLOR PALETTE BASED ON AUDIO CONTENT

(71) Applicants: King Hill, Solon, OH (US); Mark Bachmann, Medina, OH (US); Jamie Venorsky, Chagrin Falls, OH (US); Jason Hutchison, Chagrin Falls, OH (US); Kevin Delsanter, Cleveland, OH (US); Carolyn Fertig, Twinsburgh, OH (US); Kara Gildone, Concord Township, OH (US); Brian Klausner, Lyndhurst, OH (US); Scott Chapin, Avon Lake, OH (US)

(72) Inventors: King Hill, Solon, OH (US); Mark Bachmann, Medina, OH (US); Jamie Venorsky, Chagrin Falls, OH (US); Jason Hutchison, Chagrin Falls, OH (US); Kevin Delsanter, Cleveland, OH (US); Carolyn Fertig, Twinsburgh, OH (US); Kara Gildone, Concord Township, OH (US); Brian Klausner, Lyndhurst, OH (US); Scott Chapin, Avon Lake, OH (US)

(73) Assignee: Marcus Thomas LLC, Cleveland, OH (US)

( * ) Notice: Subject to any disclaimer, the term of this patent is extended or adjusted under 35 U.S.C. 154(b) by 785 days.

(21) Appl. No.: 14/156,898

(22) Filed: Jan. 16, 2014

(65) Prior Publication Data

US 2014/0201634 A1    Jul. 17, 2014

Related U.S. Application Data

(60) Provisional application No. 61/753,233, filed on Jan. 16, 2013.

(51) Int. Cl.
*G06F 3/0482* (2013.01)
*G10L 21/10* (2013.01)
*G06Q 50/00* (2012.01)

(52) U.S. Cl.
CPC .......... *G06F 3/0482* (2013.01); *G06Q 50/01* (2013.01)

(58) Field of Classification Search
None
See application file for complete search history.

(56) References Cited

U.S. PATENT DOCUMENTS

2002/0038157 A1* 3/2002 Dowling ............... A63J 17/00
                                                    700/90
2008/0141134 A1* 6/2008 Miyazaki .............. G11B 27/105
                                                    715/716

(Continued)

*Primary Examiner* — Tuan S Nguyen
(74) *Attorney, Agent, or Firm* — Ulmer & Berne LLP

(57) ABSTRACT

A computer-implemented system and method of determining a color palette to be associated with an audio selection is presented. The system and method includes receiving an audio selection, sending data associated with the audio selection to a music information server and receiving information about the audio selection, sending the information to a color palette server that selects one or more color palettes based on the information, receiving the color palettes from the color palette server, associating one of the color palettes with the audio selection, and sending the associated color palette and audio selection to one or more third parties using a mode of social media.

18 Claims, 21 Drawing Sheets

(56) References Cited

U.S. PATENT DOCUMENTS

2008/0147215 A1* 6/2008 Kim .................. G06F 17/30746
                                                    700/94
2012/0062583 A1* 3/2012 Reynolds ............... G06Q 30/02
                                                    345/589

* cited by examiner

SYSTEM AND METHOD FOR GENERATING A COLOR PALETTE BASED ON AUDIO CONTENT

REFERENCE TO RELATED APPLICATIONS

This application claims priority to U.S. Provisional Patent Application No. 61/753,233 filed Jan. 16, 2013, which is incorporated by reference.

TECHNICAL FIELD

The systems and methods described below relate generally to the field of generating a color palette based on audio content, and, more specifically, the systems and methods described below relate to the field of generating a color palette based on the musical content of an audio selection and associating the color palette with the audio selection for sharing using social media.

SUMMARY

A computer-implemented method of selecting a color palette based on media content includes sending media data to a music information server, receiving media characteristic data from the music information server that is associated with the media data, determining a color palette based at least in part on one or both of the media data and the media characteristic data, and presenting the color palette. The computer-implemented method can also include presenting alternative color palettes, receiving a selection of a color palette, and associating the selected color palette with the media data. The computer-implemented method can also include sampling audio data as the media data, or receiving a selection of a song name from a library of song as the media data. The media data can also be a selected audio stream, an audio clip, a song, a song name, a song lyric, a quote, a music genre, a human voice, a sound effect, a movie stream, or a movie clip. Media characteristic data can include music attributes such as a song name, an artist name, an icon, a length of an audio selection, an indicia of tempo, an indicia of mood, a genre, a subgenre, an indicia of instrument density, an indicia of brightness, an indicia of hardness, an indicia of percussiveness, a key, an indicia of synthecity, and a main instrument. The computer-implemented method can determine the color palette based on one or more music attributes. The color palette can be a palette that is two coordinated colors, a palette that is three coordinated colors, a palette that includes four or more coordinated colors, a palette that is a main color, a trim color, and an accent color, and a palette that includes a primary color, a secondary color, a tertiary color, or additional colors. The computer-implemented method can determine the color by looking up a color palette that is stored in a lookup table, by algorithmically determining a color palette, by deterministically selecting a color palette based on the media characteristic data, by pseudo-deterministically selecting a color palette based on the media characteristic data, or by non-deterministically selecting a color palette. The computer-implemented method can cause the posting of the color palette and an indicia of the media data, for example a song name, onto social media, such as email, or one or more social media sites.

A non-transitory computer readable medium can include instructions stored thereon that, when executed by a processor, cause the processor to receive an audio selection, send data associated with the audio selection to a music information server and receive music information data about the audio selection, send at least some of the music information data to a color palette server and receive a color palette, and display the color palette. The instructions can also allow the processor to receive a plurality of color palettes from the color palette server, display one or more of the color palettes, receive a selection of a color palette, and associated the selected color palette with the audio selection. The data associated with the audio selection can include sampled audio data that can be compressed, for example using Message Digest 5 compression. The audio selection can be selected from an audio stream, an audio clip, a song, a song name, a song lyric, a quote, a music genre, a human voice, a sound effect, a movie stream, or a movie clip. The music information data can include music attributes such as a song name, an artist name, an icon, a length of an audio selection, an indicia of tempo, an indicia of mood, a genre, a subgenre, an indicia of instrument density, an indicia of brightness, an indicia of hardness, an indicia of percussiveness, a key, an indicia of synthecity, and a main instrument. The instructions can cause the processor to select the color palette based at least in part of one or more music attributes. The instructions can instruct the processor to cause the posting of the color palette and an indicia of the audio selection onto social media.

A system can include a mobile computing device and a color palette server. The mobile computing device can be configured to receive an audio selection, send data associated with the audio selection to a music information server and receive music information data about the audio selection, send at least some of the music information data to a color palette server and receive a color palette, display the color palette, and send the color palette and one or both of the audio selection and some of the music information data via social media, for example by causing a post to a social media site or by email. The color palette server can be configured to receive some of the music information data, select a color palette based at least in part on the received music information data, and send a color palette. The color palette server can also select a plurality of alternative color palettes and send the alternative color palettes to the mobile computing device. The mobile computing device can receive the alternative color palettes, display one or more of the alternative color palettes, and receive a selection of one of the alternative color palettes. The audio selection can be a song selected from a library of songs on the mobile computing device. The mobile computing device can include a microphone input that can sample audio as the audio selection, and the data associated with the audio selection can be Message Digest 5 compressed audio data of the sample audio.

DETAILED DESCRIPTION

Figure 1:
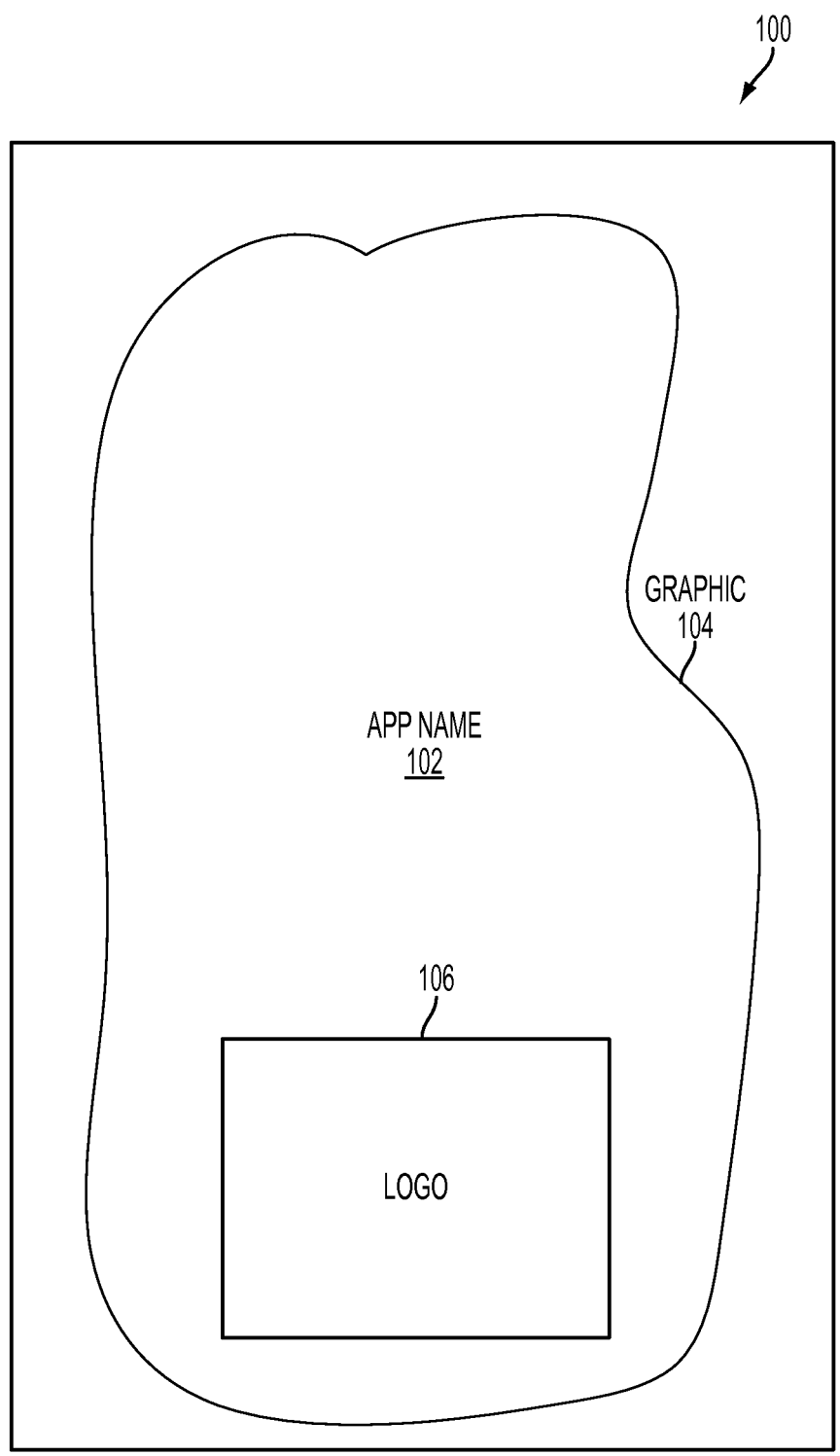
FIG. 1 is a diagram of example elements of a splash screen.

The systems and methods disclosed herein are described in detail by way of examples and with reference to the figures. It will be appreciated that modifications to disclosed and described examples, arrangements, configurations, components, elements, apparatuses, methods, systems, etc. can be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. The systems and methods disclosed herein describe systems and methods for generating a color palette based upon audio content, such as music, with selected examples disclosed and described in detail with reference made to FIGS. 1-18. Although the apparatuses, devices, systems and methods disclosed and described herein can be used to generate a color palette based upon audio content, those of ordinary skill in the art will recognize that any other suitable audio and non-audio content can be used in generating a color palette including, without limitation, a media selection such as a human voice, sound effects, movie clips, quotes, and so forth. Throughout this document, terms such as song, music, and audio may be used interchangeably, and are not intended to limit the invention to a specific embodiment. Those of ordinary skill in the art will recognize from reading the detailed description that the apparatuses, devices, methods, and systems described can be applied to, or easily modified for use with, other types of equipment, other arrangements of computing systems such as client-server, peer-to-peer, or distributed systems, and use other protocols, or operate at other layers in communication protocol stacks.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores and computing instructions in any electronic format, firmware, and embedded software. The terms information and data are used expansively and includes a wide variety of electronic information, including but not limited to machine-executable or machine-interpretable instructions; content such as text, video data, and audio data, among others; and various codes or flags. The terms information, data, and content are sometimes used interchangeably when permitted by context. It should be noted that although for clarity and to aid in understanding some examples discussed below might describe specific features or functions as part of a specific component or module, or as occurring at a specific layer of a computing device (for example, a hardware layer, operating system layer, or application layer), those features or functions may be implemented as part of a different component or module or at a different layer.

The examples discussed below are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The figures and accompanying detailed description generally describe an application, or "app," that includes computer executable instructions capable of executing on a computing platform such as a desktop, laptop, tablet, mobile computing device, or other suitable hardware. The app can include software modules, processes, application programming interfaces or APIs, drivers, helper applications such as plug-ins, databases such as search and query databases, and other types of software modules or computer programming as would be understood in the art.

In one example, an app can be an application executing on a mobile device, for example an app available for downloading onto and executing on an Apple™ iPhone™ from the Apple™ iStore™. Referring to FIG. 1, example elements of a splash screen 100 for the app are illustrated as such elements can be displayed on a display screen of the mobile device. The splash screen 100 is generally the first screen that appears on the display screen of the mobile device when an app begins executing. The splash screen 100 can include the app name 102, one or more background graphics 104, and a logo 106 or trademark that identifies a particular brand or product associated with the app. A splash screen 100 generally appears while the app is loading and can remain on the display screen until the app has completed loading, or for a short period of time after the app has loaded. The splash screen 100 can also be configured to remain on the display screen until a user taps on the display screen.

Figure 2:
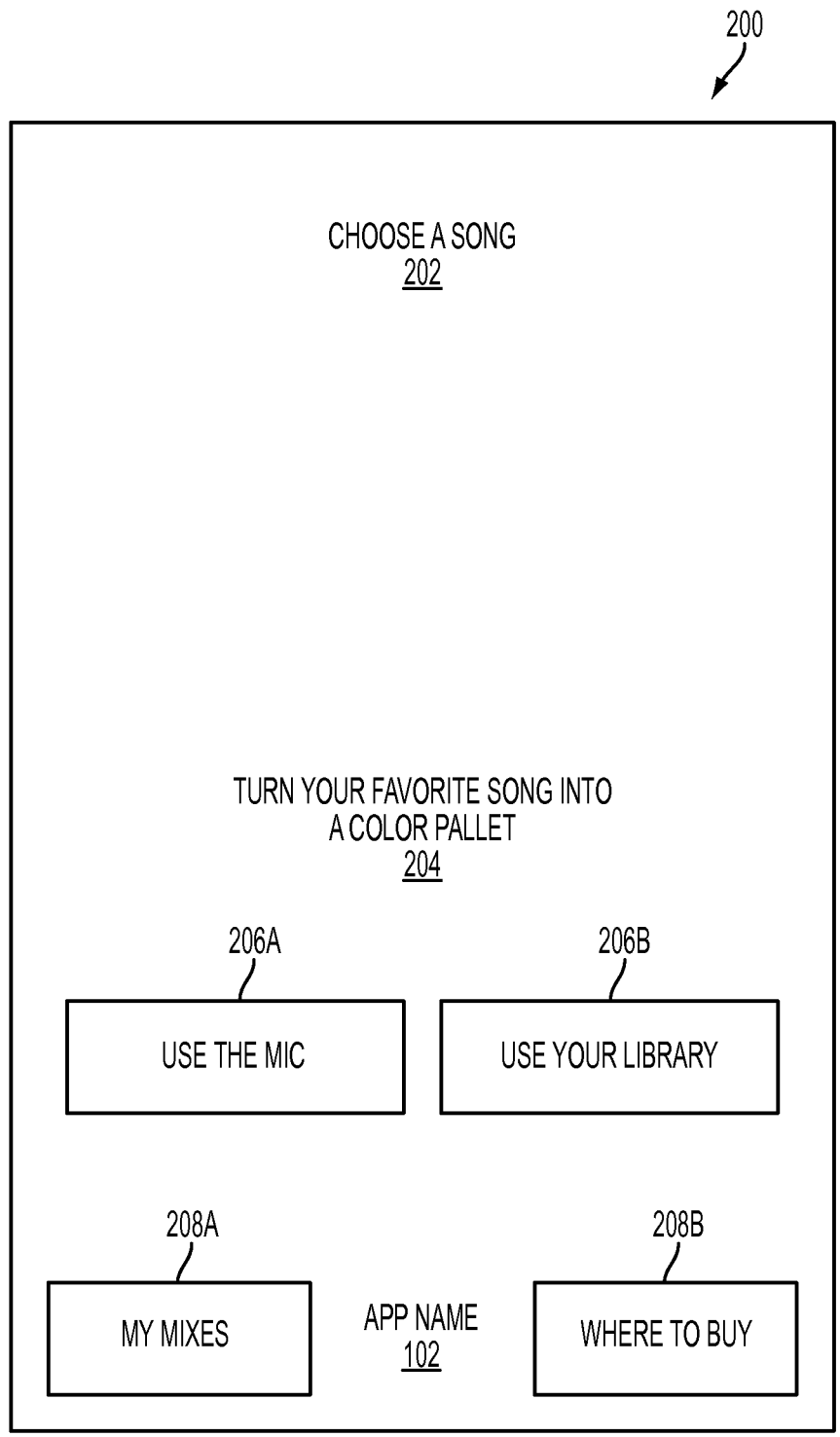
FIG. 2 is a diagram of example elements of a source selection screen.

After the splash screen 100, a source selection screen 200 can appear on the display screen of the mobile device. Referring to FIG. 2, example elements of a source selection screen 200 for the app are illustrated. The source selection screen 200 can include header information 202, for example header information 202 that describes what screen the user is viewing. In one embodiment, the header information 202 describes that the screen being viewed is for choosing a song. The source selection screen 200 can also include instructions 204, for example instructions 204 that instruct the user to select a source for turning a favorite song into a color palette. The source selection screen 200 can include one or more source selection buttons, 206A and 206B (collectively source selection buttons 206). In an embodiment, a first source selection button 206A allows a user to select the microphone or "MIC" of the mobile device as the source for sampling music that is currently playing audibly in the user's environment. A second source selection button 206B allows a user to select a song or a portion of a song from a library of songs or other audio content stored on the mobile device. Other source selection buttons 206 can also be used. For example, a source selection button 206 can be arranged to obtain audio content from the Internet, a server, or other such remote location accessible by the mobile device.

The source selection screen 200 can include the app name 102, for example in the footer area of the source selection screen 200 as illustrated in FIG. 2. The source selection screen 200 can also include application selection buttons 208A, 208B (collectively application selection buttons 208) that can be in the header area, the footer area, or any other appropriate area of the source selection screen 200. Example application selection buttons 208 include a My Mixes application selection button 208A that allows the user to view a list of saved songs and associated color palettes (see FIG. 14 and accompanying detailed description below). Other example application selections buttons 208 can include a Where to Buy application selection button 208B. When selected, Where to Buy application selection button 208B can open a browser window (for example, an Apple™ Safari™ browser window) that hyperlinks to a website associated with the brand or product identified with the logo 106 presented above in the splash screen 100, and that provides a store lookup service, or store information, where their product can be purchased.

Figure 6:
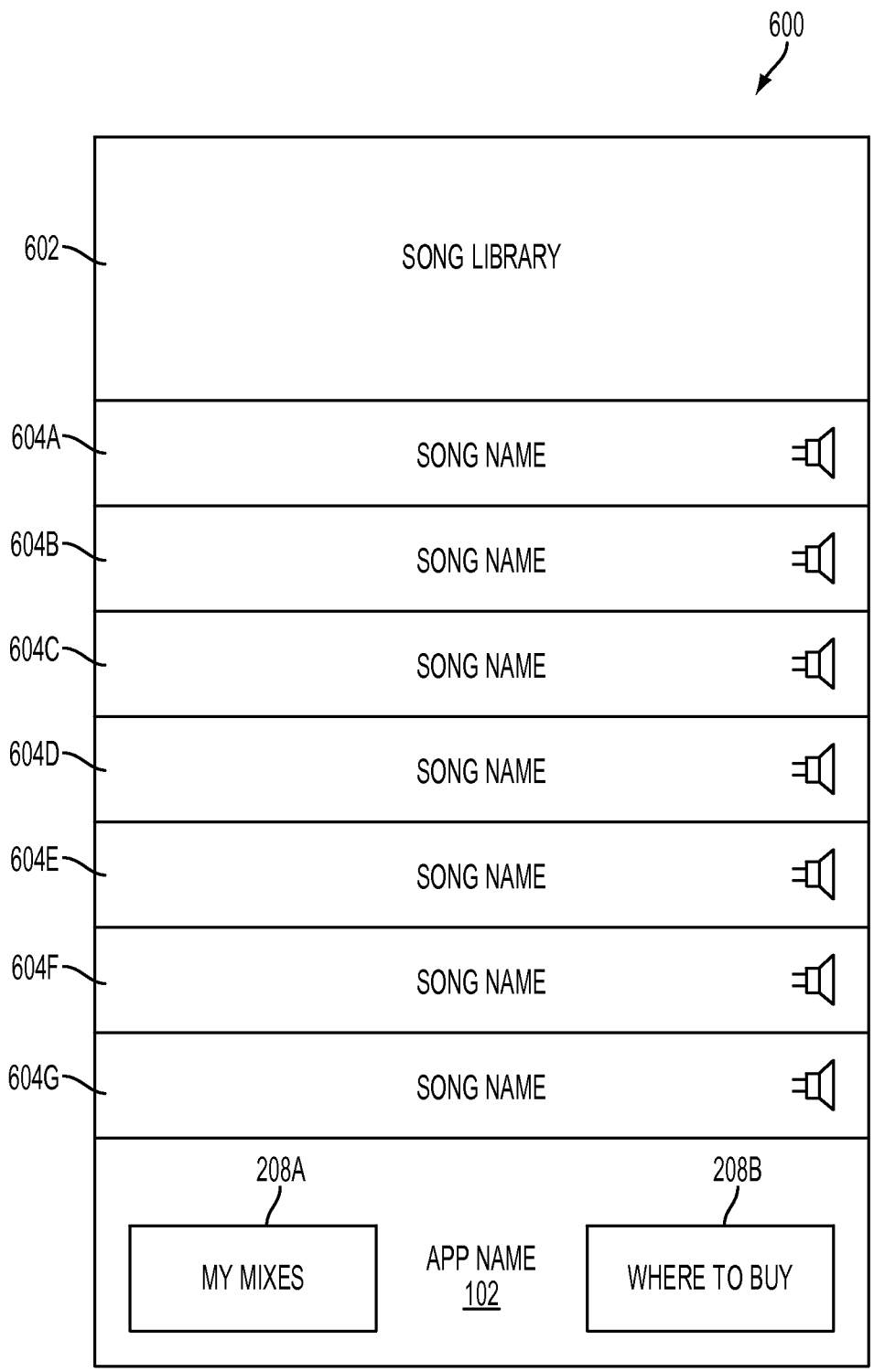
FIG. 6 is a diagram of example elements of a screen for manually selecting a song from a user library.

If the user selected the second source selection button 206B to select a song from their library, a screen for manually selecting a song from the user library 600 (FIG. 6) is presented. Referring to FIG. 6, example elements of a screen for manually selecting a song from the user library 600 for the app are illustrated. The screen for manually selecting a song from the user library 600 can include header information 602, for example header information 602 that describes what screen the user is viewing. In one embodiment, the header information 602 describes that the screen being viewed is a list of songs in the user's library, for example songs stored on the user's mobile computing device. The screen for manually selecting a song from the user library 600 can include the app name 102 and application selections buttons 208, as described above for the source selection screen 200 and similar to the elements depicted in FIG. 2. The screen for manually selecting a song from the user library 600 can include a list of songs 604A, 604B, 604C, 604D, 604E, 604F, and 604G (collectively songs 604). The songs 604 can be arranged and selectable using any suitable control or widget, and can be arranged in a cycle box type arrangement. Once a user selects a song 604, a screen displayed during processing 700 is presented, as described below for FIG. 7.

Figure 3:
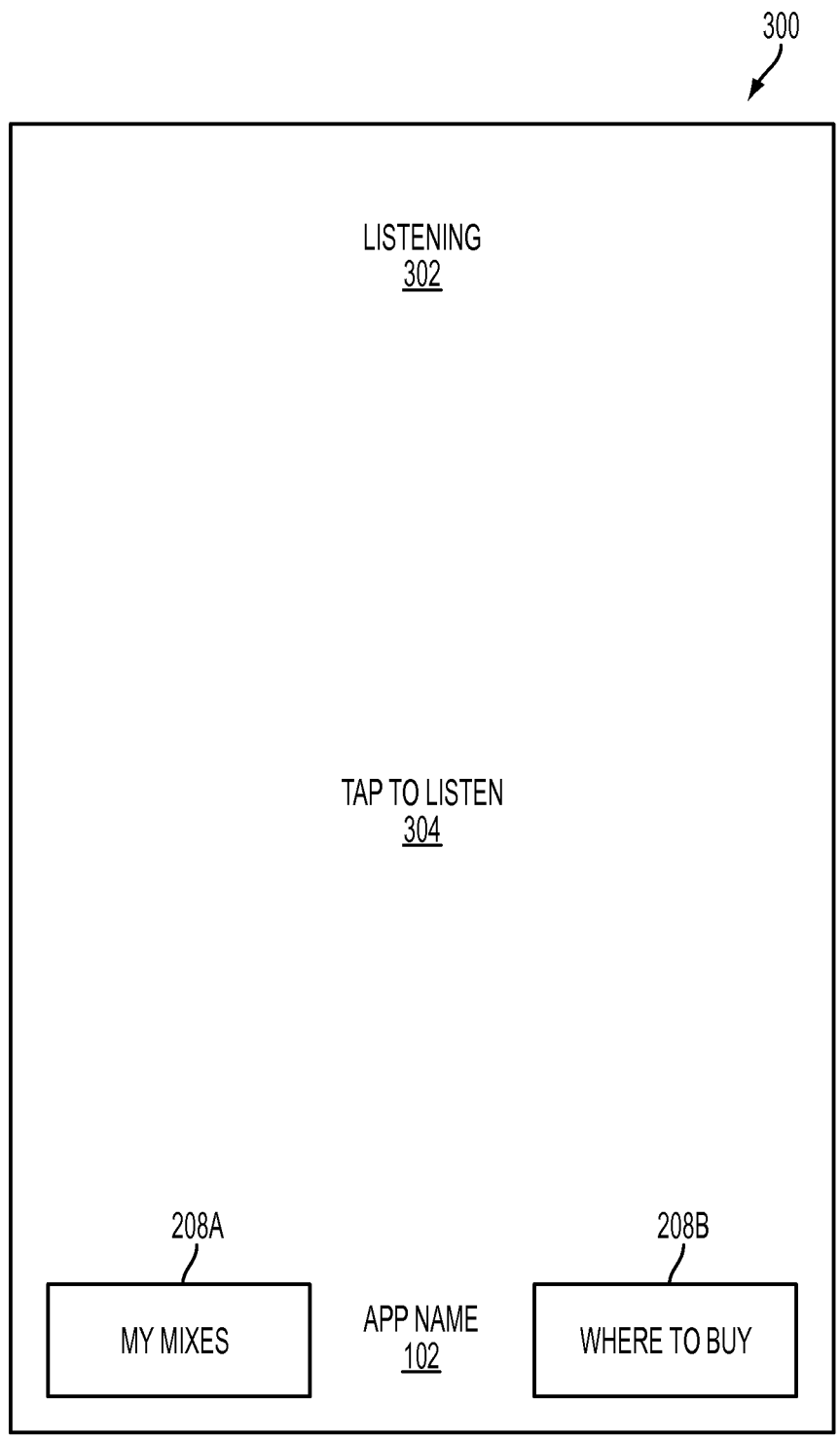
FIG. 3 is a diagram of example elements of a music listening screen.

Referring again to FIG. 2, if the user presses the first source selection button 206A to select the MIC or microphone for sampling music, a music listening screen 300 is presented. FIG. 3 depicts example elements of a music listening screen 300 for the app. The music listening screen 300 can include header information 302, for example header information 302 that describes what screen the user is viewing. In one embodiment, the header information 302 describes that the screen being viewed is for having the computing device sample music playing in the user's environment, e.g., "listening." The music listening screen 300 can include the app name 102 and application selections buttons 208, as described above for the source selection screen 200 and similar to the elements depicted in FIG. 2. The music listening screen 300 can include a Tap to Listen selection button 304 to initiate the sampling of the music by the computing device. The Tap to Listen selection button 304 can be sensitive to user presses in an area proximate to the Tap to Listen selection button 304. Or the Tap to Listen selection button 304 can use the entire screen area except for areas dedicated to the application selection buttons 208 or the Tap to Listen selection button 304 can include an actual button area (not shown). When the user taps the screen proximate to the Tap to Listen selection button 304, the app can use a microphone on the computing device to sample music playing in the user's environment.

The app can sample music or audio for a configurable period of time, for example to obtain a ten second sample of the music or audio. The app can be configured so that it continues to sample music until the Tap to Listen selection button 304 is pressed again by the user. The app can be configured to continue to sample music until the sampled music is recognized or its attributes determined. The sampled music can be captured in a lossless format, for example the Waveform Audio File Format, or WAV format. The sampled music can also be captured in, or processed into, a lossy format, for example the MPEG-1 or MPEG-2 Audio Layer III, or MP3 format. The app can process the sampled music, for example to compress the data. For example, the sampled music can be processed in accordance with a hashing function appropriate for identifying music, such as the MD5 Message-Digest 5 Algorithm or other such algorithms. The app can use the sampled music or processed sampled music to identify the music and/or characteristics of the music. For example, the app can identify the name of the song currently playing and the artist that recorded the song. The music can be identified from the songs present in the user's library. The music can be identified by sending the sample of the music, the processed sampled music, or any other suitable information to a music identification server. In an embodiment, a ten second sample of the music can be sent in an MP3 format to a music identification server. The sample of the music can be sent in an encrypted or in an unencrypted format.

The music identification server can receive the sample of music and send information about the sample of music to the app. The song information can include the song name or title, an icon, for example an icon associated with an album, the length of the song, and other information about the song. The song information can be structured or in categories such as tempo, mood, genre, subgenre, instrument density, brightness, hardness, percussiveness, key, synthecity, main instrument, and other song information. The song information for a particular category can be a scale or rank, such as a range or numeric rank, or can include one or more descriptive names. For example, tempo can include descriptive names such as slow, mid-tempo, and fast. Mood can include descriptive names such as energetic, melancholic, relaxing, happy, danceable, powerful, fun, calm, slow, and fast. Genre can include descriptive names such as rock, country, classical, Latin, rap, dance, soul, electronic, jazz, speech, pop, urban, world, alternative, ambient, blues, children, Christian, folk, instrumental, metal, reggae, singer/songwriter, soundtrack, and unknown. Subgenre can include descriptive names such as pop:country, classical:symphonic, rock:nurock, classical:choir, pop:70tiesdisco, world:Bollywood, urban:rootsreggea, world:Balkanbrass, urban:hiphop, urban:dancehallreggea speech:speechwithbackground, classical:opera, classical:piano, electronic:techno, pop:synthpop, jazz:swing, rock:surfbeat, rock:garagebeat, electronic:drumandbass, world:flamenco, rock:punk, jazz:bluenote, speech:speechonly, and rock:metal. Instrument density can include descriptive names such as full and sparse. Brightness can include descriptive names such as dark and bright. Hardness can include descriptive names such as soft, intermediate, and hard. Percussiveness can include descriptive names such as percussive and non-percussive. Key can include descriptive names such as major and minor. Synthecity can include descriptive names such as electroacoustic, acoustic, and synthetic. Main instrument can include descriptive names such as organ, guitar, violin, trumpet, piano, and saxophone. In an embodiment, the information about the song, can be determined by the app, for example from the music that was sampled. In an embodiment, the information about the song can also be manually entered or changed by the user. Once the music is identified, a screen displayed during processing 700 is presented, as described below for FIG. 7.

Figure 4:
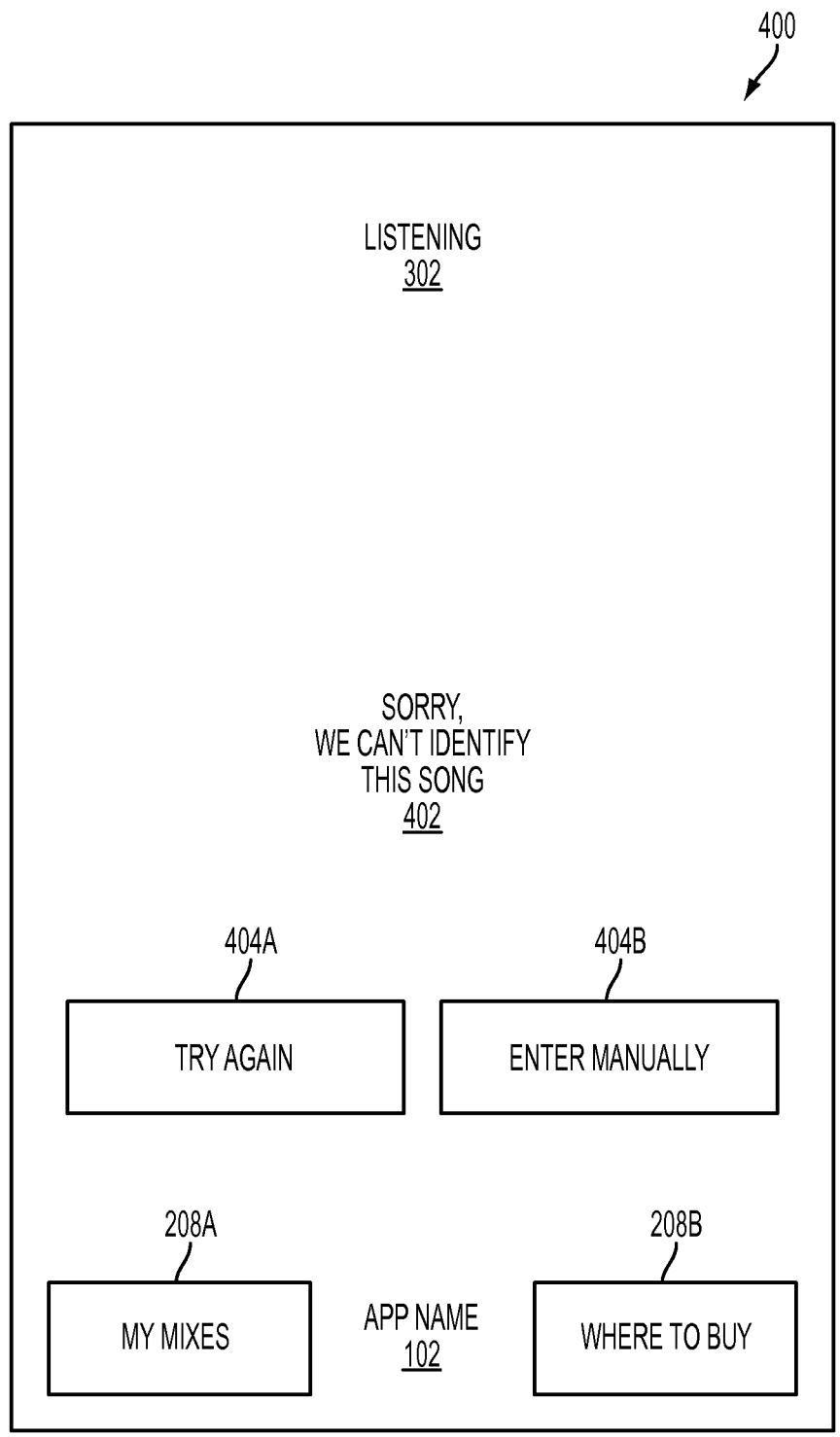
FIG. 4 is a diagram of example elements of a screen for obtaining further user direction.

If the music cannot be identified, either by the app or by a music identification server, the app can present a screen for obtaining further user direction. Referring to FIG. 4, example elements of a screen for obtaining further user direction 400 for the app are illustrated. The screen for obtaining further user direction 400 can include header information 302 as described above for the music listening screen 300 and as illustrated in FIG. 3, and the app name 102 and application selections buttons 208, as described above for the source selection screen 200 and as illustrated in FIG. 2. The screen for obtaining further user direction 400 can also include option selection buttons 404A, 404B (collectively option selection buttons 404). The first option selection button 404A, or Try Again selection button, when selected, returns operation to the music listening screen 300, thereby allowing the user to repeat the process of sampling the music. A second option selection button 404B, the Enter Manually selection button, when selected, allows the user to manually enter information about the music. In a configuration, if the app is unable to connect to a music identification server, or if no network is available, then the app can limit the user to manual entry of information. This configuration allows the user to continue to generate palettes by executing the app in a standalone mode.

Figure 5:
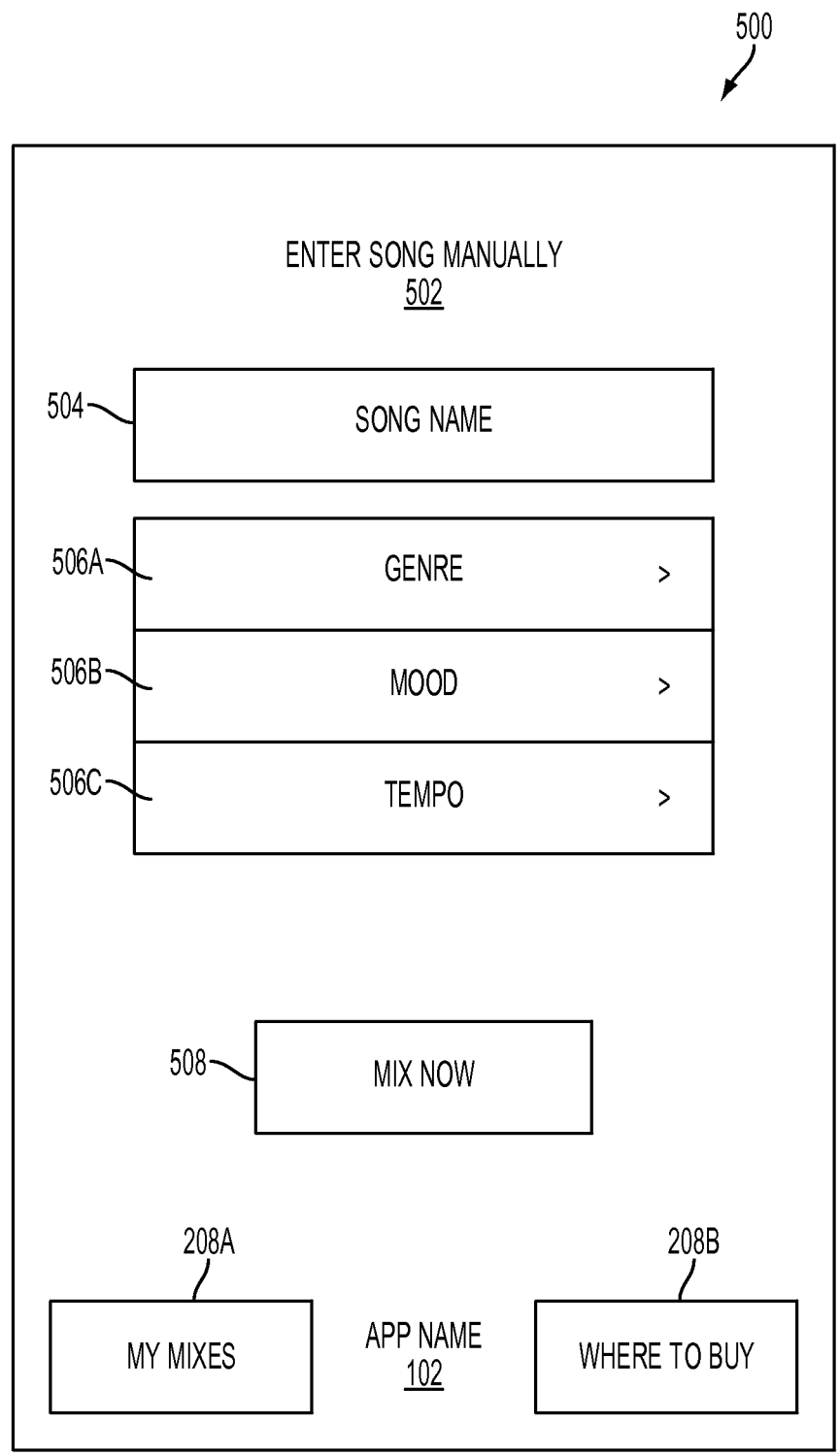
FIG. 5 is a diagram of example elements of a screen for manually searching for a song.

When the user selects the second option selection button 404B, or Enter Manually selection button, the app can present a screen for manually entering a song. Referring to FIG. 5, example elements of a screen for manually entering a song 500 for the app are illustrated. The screen for manually entering a song 500 can include the app name 102 and application selections buttons 208, as described above for the source selection screen 200 and as illustrated in FIG. 2. The screen for manually entering a song 500 can include header information 502, for example header information 502 that describes that the user is viewing a screen for manually entering a song by name and entering characteristics of the song. The screen for manually entering a song 500 can include a song name text box 504. When selected, the song name text box 504 can trigger a keyboard popup window for entering the name of a song. As a user enters characters into the song name text box 504, the song name can be auto-completed, if known, or checked for spelling.

The song name that is entered by the user into the song name text box 504 becomes associated with the song information that the user enters into the song information boxes 506A, 506B, 506C (collectively song information boxes 506). The song information boxes 506, in various embodiments, can be text boxes, drop down lists, list boxes, combo boxes, radio buttons, cycle buttons, or any other suitable type of control boxes or app widgets. Song information can be entered using a genre song information box 506A, a mood song information box 506B, a tempo song information box 506C, and any other suitable song information box 506 for entering song information. Example song information is described above for the music listening screen 300. In an embodiment, the action button 508, or Mix Now action button, can be activated only once a song name is entered into the song name text box 504 and song information is identified in one or more of song information boxes 506. Once the action button 508 is activated, a screen displayed during processing 700 is presented, as described below for FIG. 7.

In another embodiment, when the music cannot be identified, the sampled music can be analyzed by an algorithm to determine certain properties of the music. For example, based on the tempo, perceived instruments used to generate the music, pattern of notes, etc., an algorithm may determine the genre of a music sample such as determining that the music sample is in the musical category jazz or blues or any other recognizable genre. Such categorization can be used to determine an appropriate color palette to associate with the music when the music cannot be identified.

Figure 7:
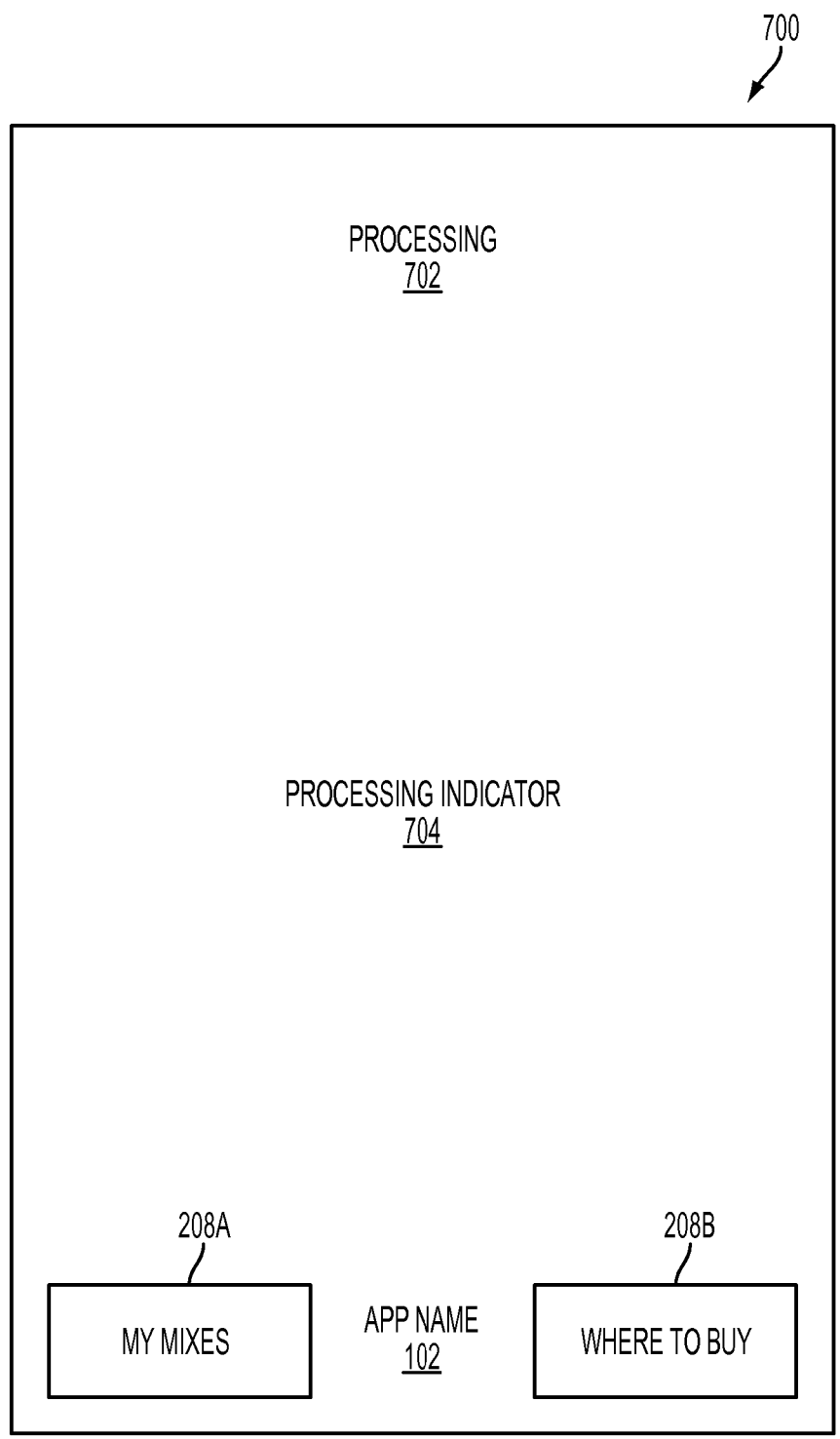
FIG. 7 is a diagram of example elements of a screen displayed during processing.

Referring to FIG. 7, example elements of a screen displayed during processing 700 for the app are illustrated. The screen displayed during processing 700 can include the app name 102 and application selections buttons 208, as described above for the source selection screen 200 and as illustrated in FIG. 2. The screen displayed during processing 700 can include header information 702, for example header information 702 that indicates that the app is processing the song name and song information (or other forms of audio content) to determine one or more matching color palettes. The screen displayed during processing 700 can also include a processing indicator 704, for example an hourglass icon, percentage indicator, or any other suitable indicator to inform the user that the app is currently processing. The screen displayed during processing 700 is presented when the app is determining one or more color palettes (not shown, see FIGS. 8 and 9) to associate with a song, or the song information. The app can send the song title to a music identification server and receive song information, such as genre, mood, and tempo as well as any other suitable information. The app can use the song title and song information to determine one or more color palettes to associate with the song and song information.

Figure 8:
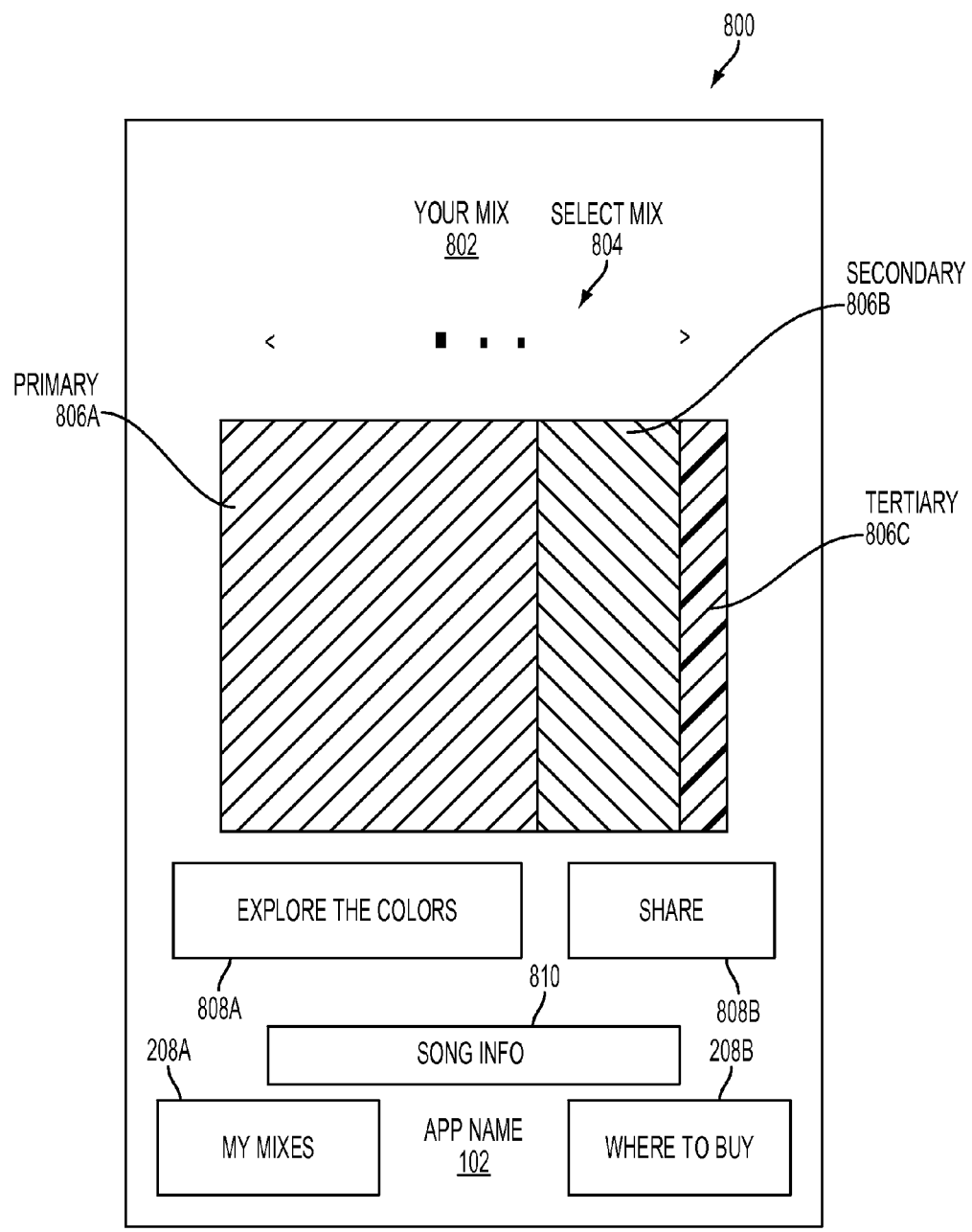
FIG. 8 is a diagram of example elements of a screen for displaying a color palette.
Figure 9:
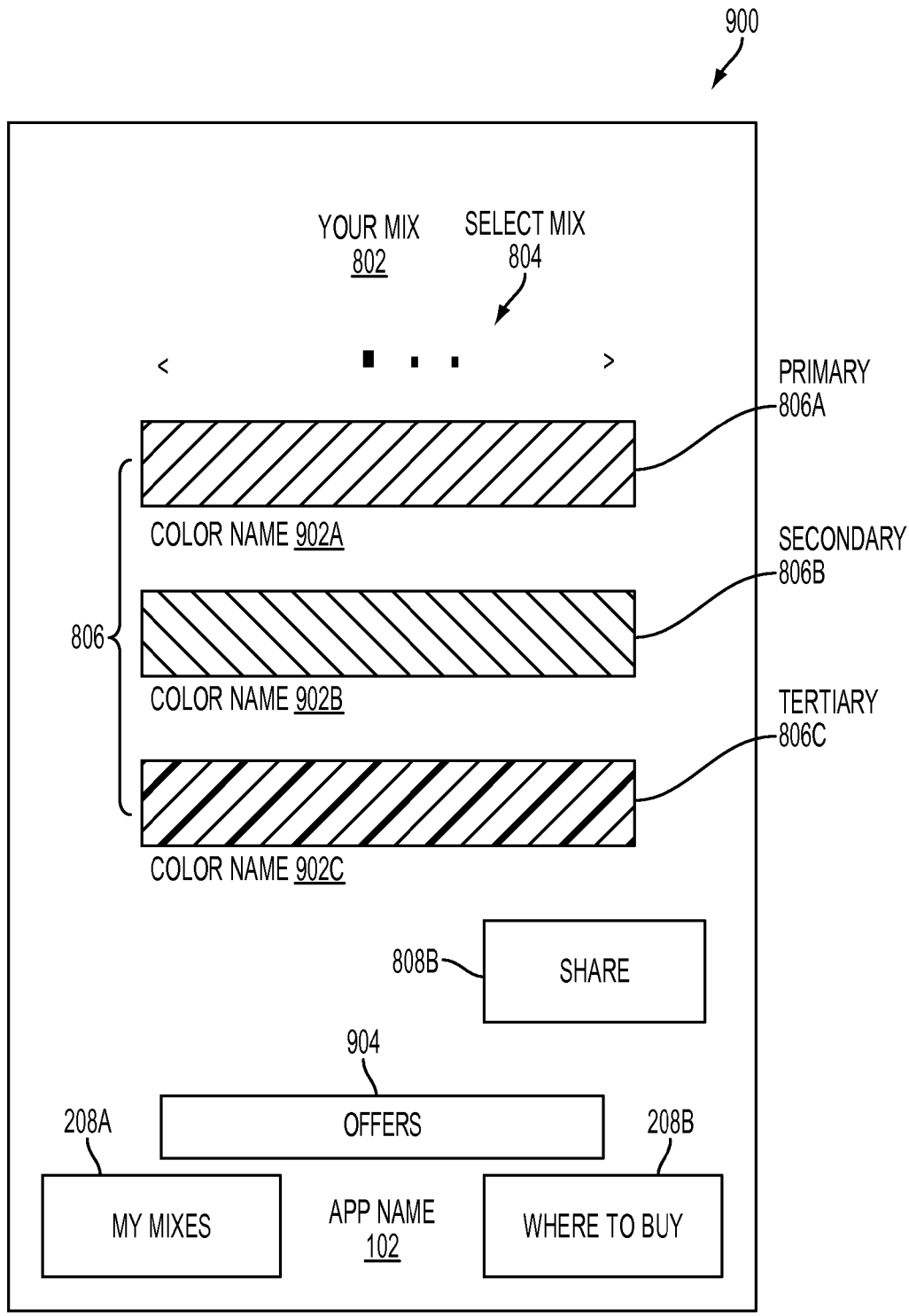
FIG. 9 is a diagram of example elements of a screen for displaying members of the color palette of FIG. 8.

A color palette can be selected from the set of all color palettes. The set of color palettes can be generated manually, or algorithmically. For example, each color palette can be selected manually by a designer and stored in a lookup table. In a configuration, the designer can choose a main color and the other colors of the palette can be generated by an algorithm or from known palettes. In a configuration, a set of three color palettes can be generated for each combination of genre, mood, and tempo. The determination of which of the color palettes to present to the user can be deterministic, pseudo-deterministic, or non-deterministic. In a deterministic mode, a first color palette to present to the user can be associated with a particular song or combination of song information elements, and alternative color palettes can be presented as alternative color palettes, as described below and as illustrated in FIGS. 8 and 9. In a pseudo-deterministic mode, one or more color palettes can always be associated with a particular song or combination of song information elements; however, the determination of which of the color palettes to present first and in which order to present the alternative color palettes can be based on one or more additional variables. For example, the first color palette (selected from the set of all matching color palettes) can be presented to different users in a round-robin approach, thereby presenting to users different color palettes from the set of all matching color palettes, even if the users select the same song. In another pseudo-deterministic mode, the first color palette can be randomly selected from the set of all matching color palettes, or selected based on a characteristic of the user, such as the user's name. In a non-deterministic mode, the color palette can be randomly selected or the color palette can be selected based on any information available including time of day, a characteristic of the user, or any other suitable information. The color palettes can be stored locally on the app on the mobile computing device, on a palette server, or both.

Once a color palette or a set of color palettes is determined, the app can display a screen for displaying the color palette 800. Referring to FIG. 8, example elements of a screen for displaying a color palette 800 for the app are illustrated. The screen for displaying a color palette 800 can include the app name 102 and application selections buttons 208, as described above for the source selection screen 200 and as illustrated in FIG. 2. The screen for displaying a color palette 800 can include header information 802, for example header information 802 that indicates that the app is presenting a mix, or color palette 806, that is associated with the song name or song information. The screen for displaying a color palette 800 can display a primary color 806A, a secondary color 806B, and a tertiary color 806C (collectively a color palette 806). The respective sizes of the primary color 806A, the secondary color 806B, and the tertiary color 806C can be different or the same. In an embodiment, the primary color 806A can represent a main color of the palette 806, the secondary color 806B can represent a trim color to be used with the main color, and the tertiary color 806C can represent an accent color to be used with the main and trim colors. Color palettes 806 can include any suitable number of colors, including two or more colors. In an example, color palettes 806 can be arranged for use in decorating a room in a home or office, with certain colors of the color palette 806 assigned to walls, trim, door, windows, portions of walls, and so forth. In another example, color palettes 806 can be arranged for use in a color scheme for clothing, carpeting, automobiles, consumer products, and other suitable applications.

Figure 11:
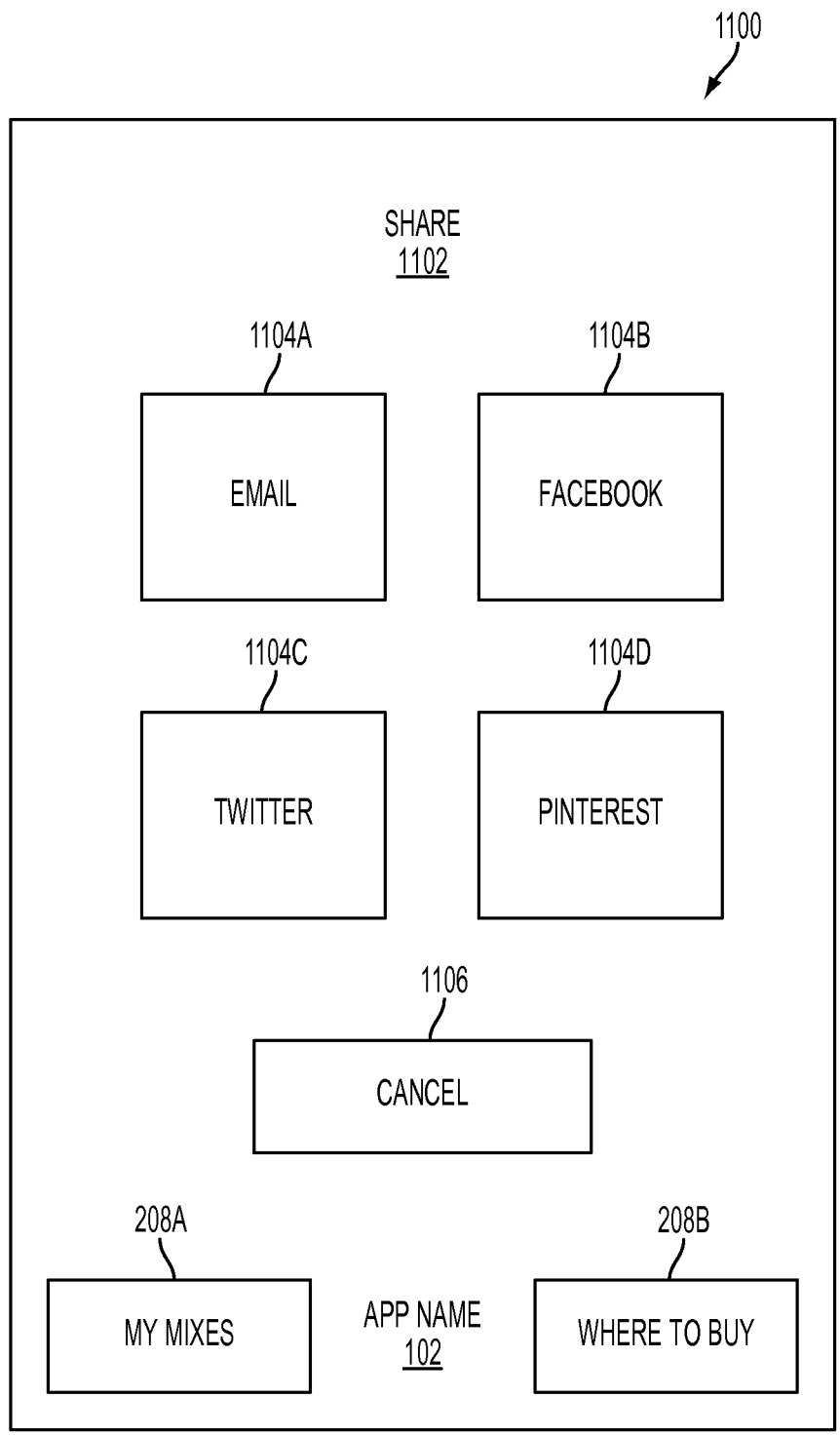
FIG. 11 is a diagram of example elements of a screen for sending a color palette to social media.
Figure 13:
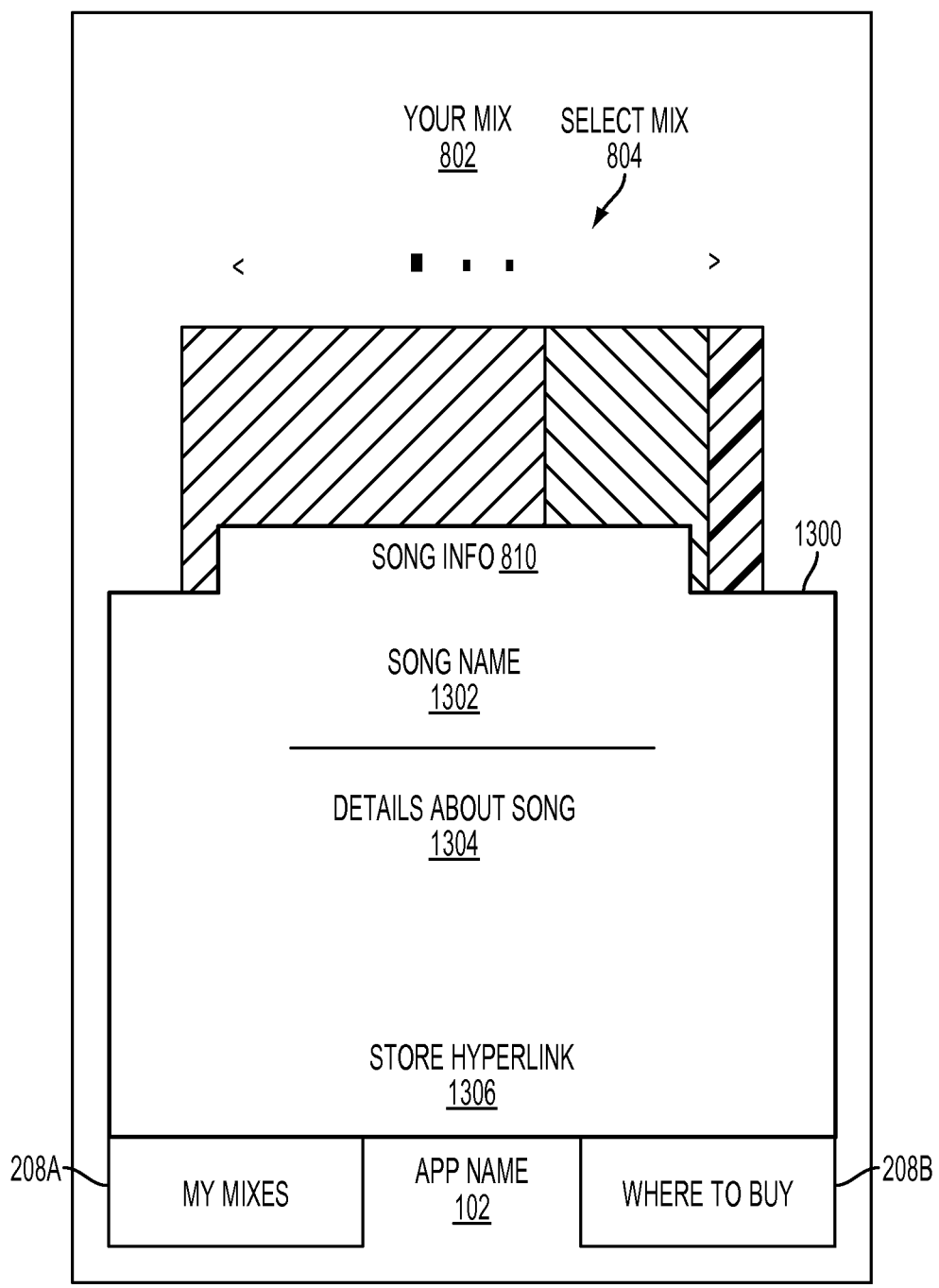
FIG. 13 is a diagram of example elements of a popup window for displaying information about a song.

The screen for displaying a color palette 800 can include a mix selector control 804 for selecting between available mixes, for example by including arrow buttons for cycling between color palettes 806. The screen for displaying a color palette 800 can include selection buttons 808A, 808B (collectively selection buttons 808). When the first selection button 808A, the explore the colors selection button, is selected the app displays the screen for displaying members of the color palette 900 as describe below and as illustrated in FIG. 9. When the second selection button 808B, the share selection button, is selected, the app displays the screen for sending a color palette to social media 1100 as described below and as illustrated in FIG. 11. The screen for displaying a color palette 800 can include a popup control 810, the song information popup control, that when selected triggers the app to display information about the song as described below and as illustrated in FIG. 13.

When the first selection button 808A, the explore the colors selection button, is selected the app displays the screen for displaying members of the color palette 900. Referring to FIG. 9, example elements of a screen for displaying members of the color palette 900 for the app are illustrated. The screen for displaying members of the color palette 900 can include the app name 102 and application selections buttons 208, as described above for the source selection screen 200 and as illustrated in FIG. 2. The screen for displaying members of the color palette 900 can include header information 802, for example header information 802 that indicates that the app is presenting a mix, or color palette 806, that is associated with the song name or song information. The screen for displaying members of the color palette 900 can include a mix selector control 804 for selecting between available mixes, for example by including arrow buttons for cycling between color palettes 806. The screen for displaying members of the color palette 900 can include a selection button 808B, the share selection button for sending a color palette to social media 1100 as described below and as illustrated in FIG. 11. The screen for displaying members of the color palette 900 can display a first color name 902A associated with the primary color 806A, a second color name 902B associated with the secondary color 806B, and a third color name 902C associated with the tertiary color 806C. The screen for displaying members of the color palette 900 can include a popup control 904, the offers popup control, that when selected triggers the app to display information about offers relating to products associated with the color palette 806 or the particular brand associated with the app, as described below and as illustrated in FIG. 10.

Figure 10:
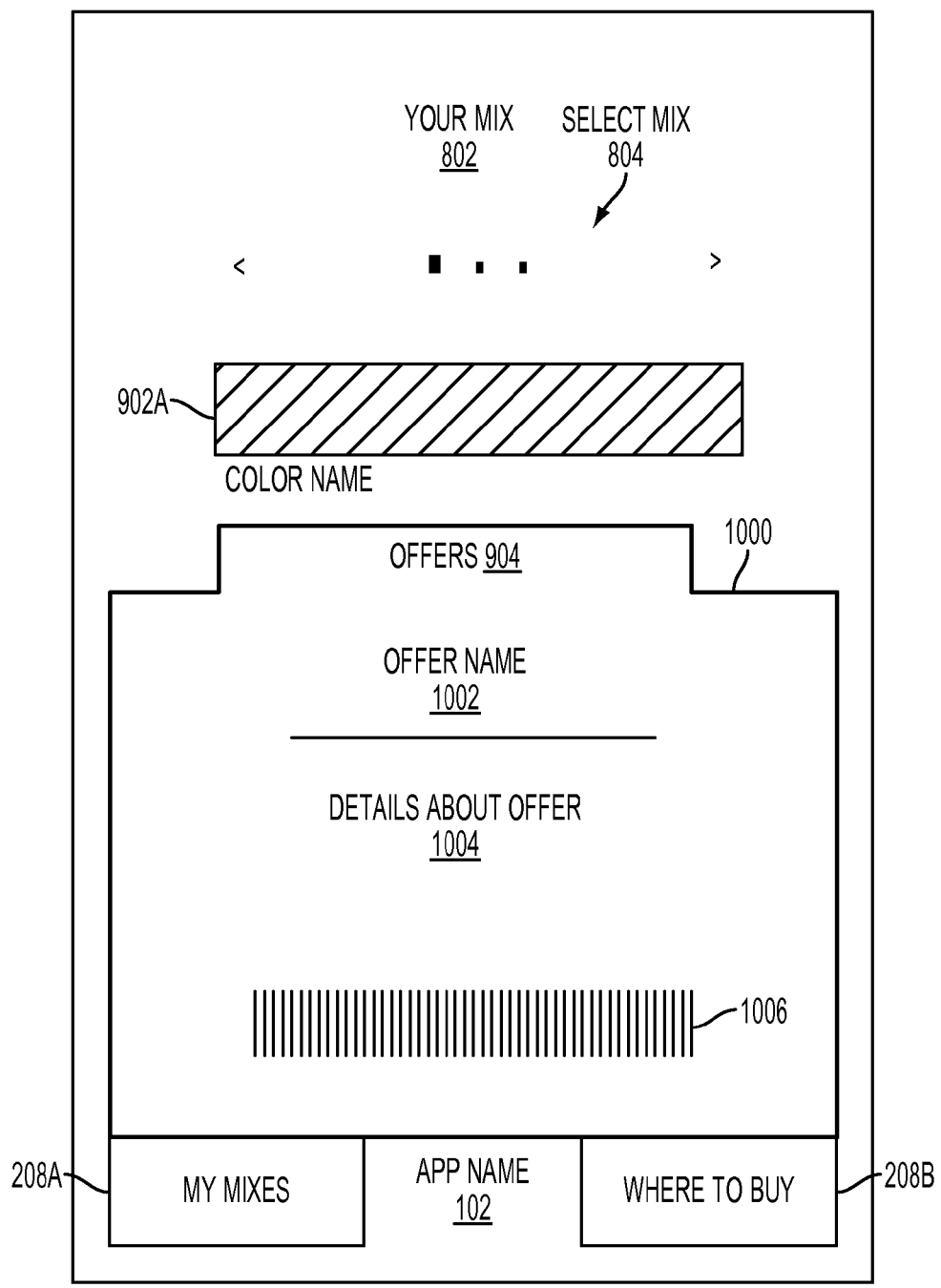
FIG. 10 is a diagram of example elements of a popup menu for displaying offers.

Referring to FIG. 10, example elements of popup window for displaying offers 1000 for the app are illustrated. The popup window for displaying offers 1000 can include the popup control 904 for expanding or reducing the popup window, a name 1002 associated with the offer, details 1004 about the offer, and one or more barcodes 1006 about the offer. Other suitable information can be included in the popup window for displaying offers 1000. In an embodiment, the barcode 1006 is a standard linear barcode such as a UPC barcode for identifying the product or a barcode for providing a discount. In other embodiments, the barcode 1006 can be a QR code, or quick response code. The barcode can include information about the products, a sale or discount, hyperlinks to other information, or any other suitable information. The barcode 1006 can be selectable and include a hyperlink.

Referring to FIG. 11, example elements of a screen for sending a color palette to social media 1100 for the app are illustrated. The screen for sending a color palette to social media 1100 can include the app name 102 and application selections buttons 208, as described above for the source selection screen 200 and as illustrated in FIG. 2. The screen for sending a color palette to social media 1100 can include header information 1102, for example header information 1102 that indicates that the user is going to share the palette using social media. The screen for sending a color palette to social media 1100 can include social media selector buttons for email 1104A, Facebook™ 1104B, Twitter™ 1104C, and Pinterest™ 1104D (collectively social media selector buttons 1104). Other social media selector buttons can be included to send a color palette to other social media. The screen for sending a color palette to social media 1100 can include a cancel selector button 1106 to return to a previous screen without sending the color palette to social media. Additional methods of sharing saved mixes, or building a sharing collections in libraries are also considered, and can include additional screens similar to the screen for sending a color palette to social media 1100 and other screens in this disclosure.

Figure 12A:
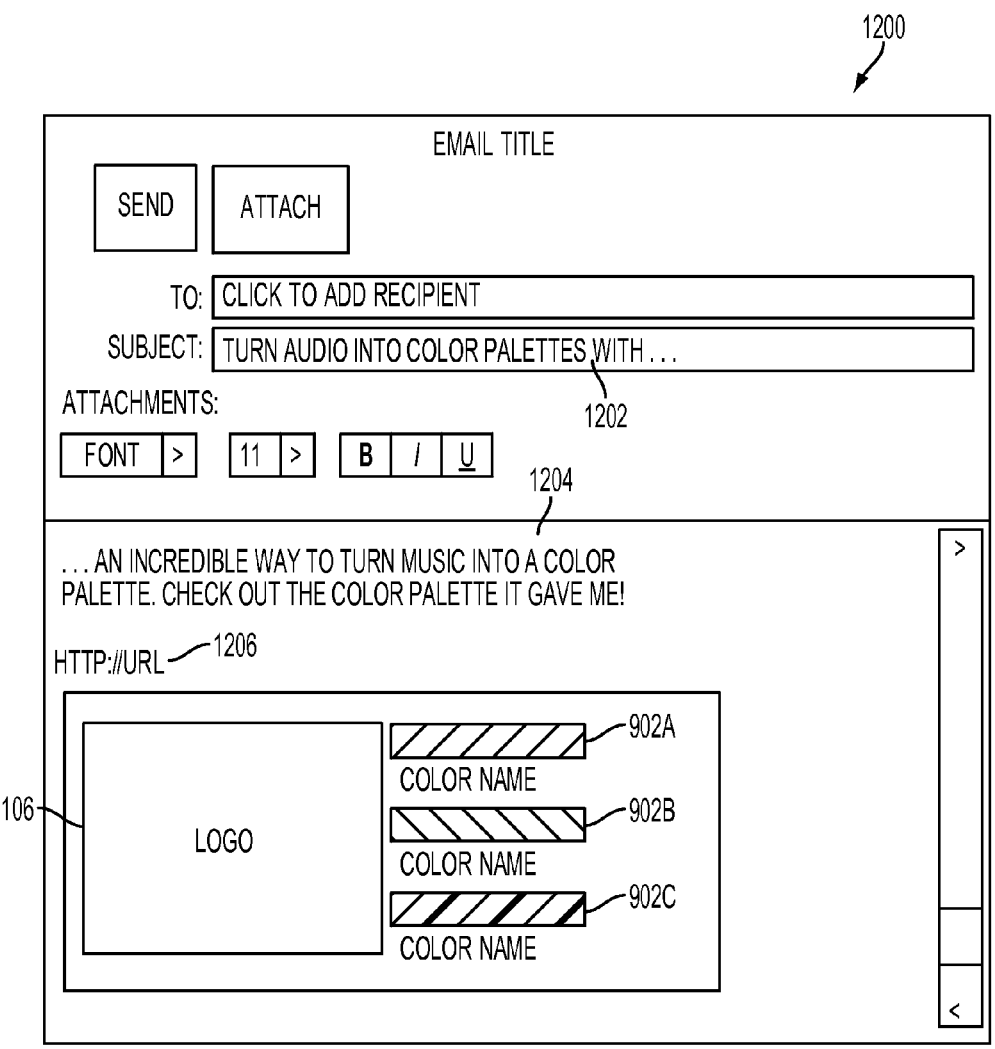
FIGS. 12A, 12B, 12C, and 12D are diagrams of example elements of social media screens displaying a color palette.

Referring to FIGS. 12A, 12B, 12C, and 12D, example elements of social media screens are illustrated. FIG. 12A illustrates an example email 1200 that includes a logo 106 or trademark that identifies a particular brand or product associated with the app, and a first color name 902A, a second color name 902B, and a third color name 902C associated with a color palette. The message can include a subject line 1202, a message body 1204, and a URL 1206 or Uniform Resource Locator. The URL 1206 can allow the recipient to access a web-based version of the app, download a copy of the app to their mobile device, or can be any other suitable URL. The URL 1206 can be a shortened URL as described below for a Twitter™ tweet 1220.

Figure 12B:
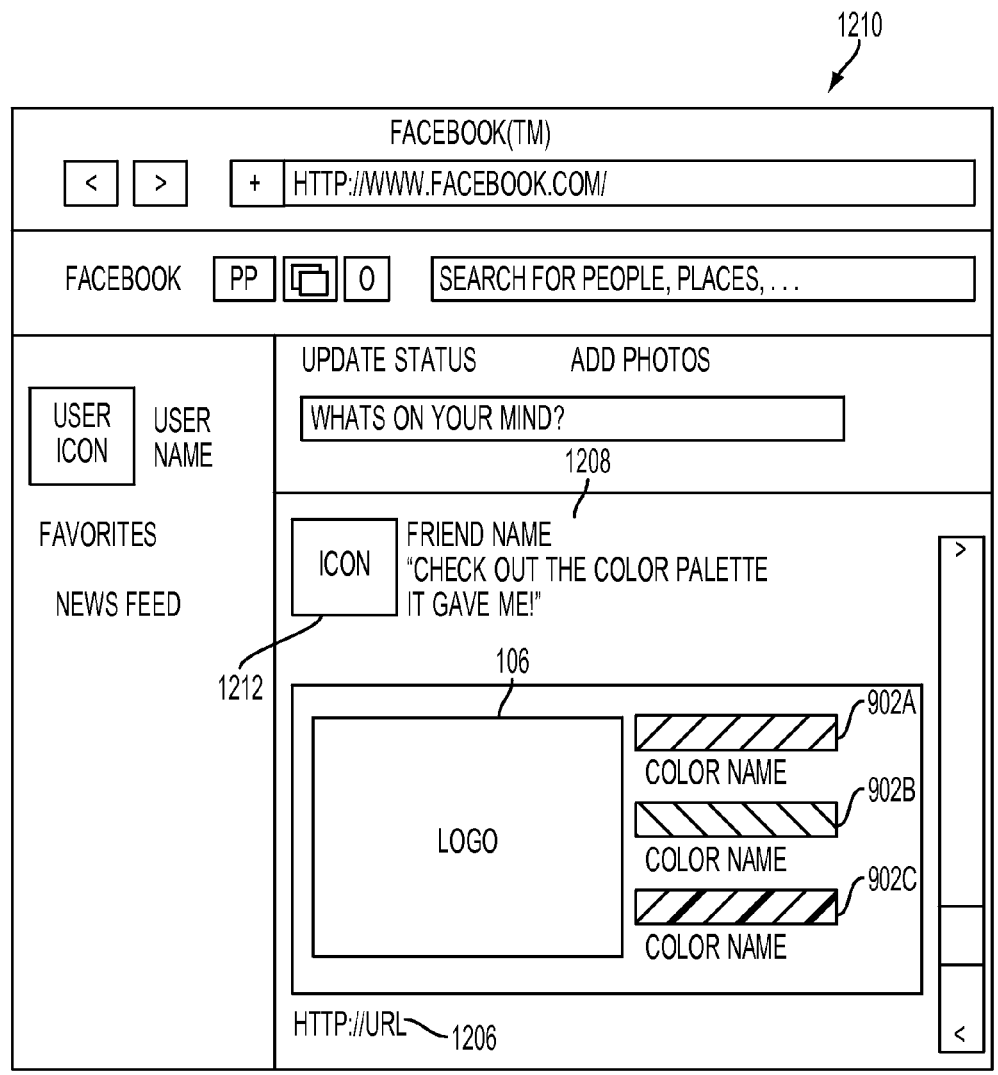

FIG. 12B illustrates an example Facebook™ post 1210 that includes a logo 106 or trademark that identifies a particular brand or product associated with the app, and a first color name 902A, a second color name 902B, and a third color name 902C associated with a color palette. The post 1210 can include a message 1208, and an icon 1212 identifying the person who posted the post 1210. The post 1210 can include a URL 1206, or a shortened URL (not shown) as described for the tweet 1220 below.

Figure 12C:
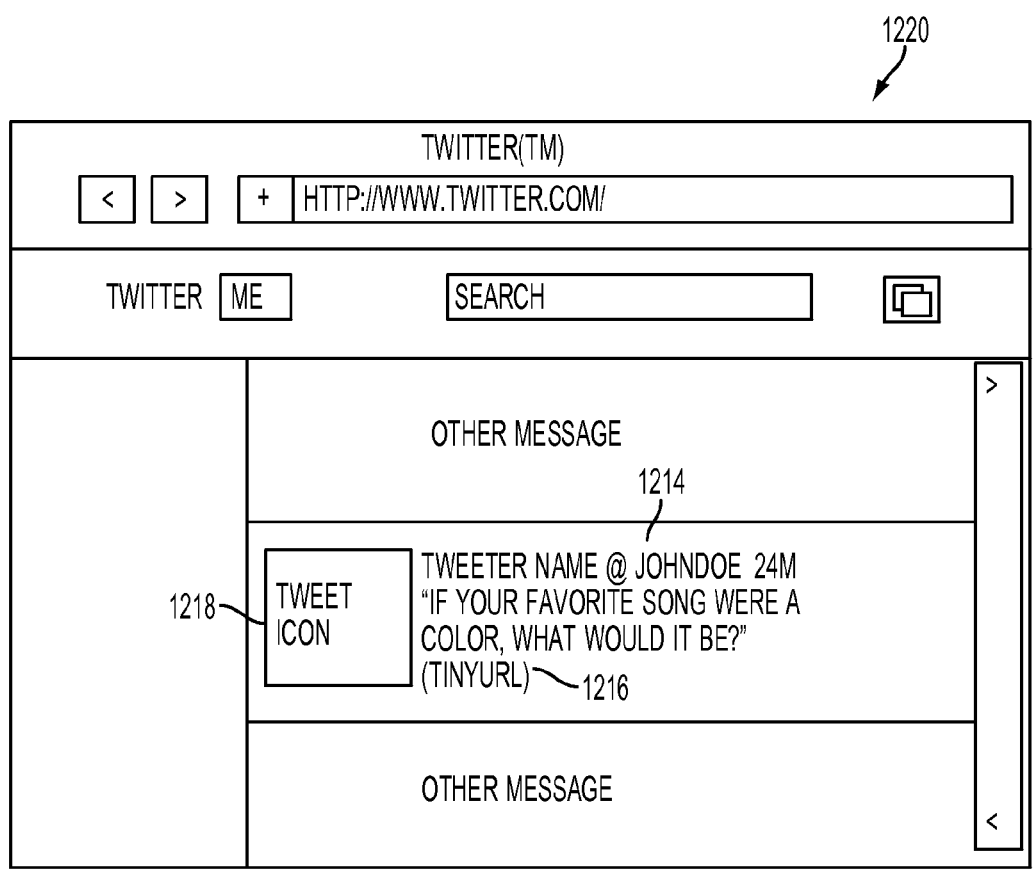

FIG. 12C illustrates an example Twitter™ tweet 1220 that includes the tweeted message 1214, and a tweet icon 1218 identifying the person or entity who tweeted the tweet 1220. The tweet 1220 can include a shortened URL 1216, for example a shortened URL 1216 offered by a URL redirection service such as tinyurl.com. The tweet 1220 can include a URL (not shown) as described for the email 1200 above.

Figure 12D:
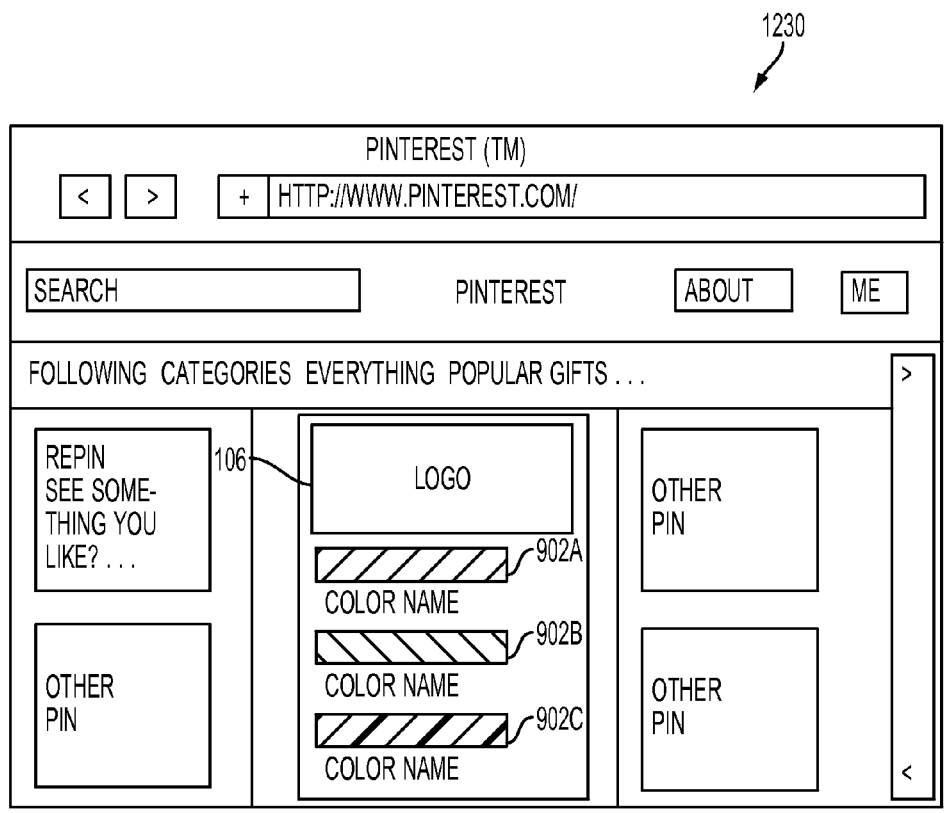

FIG. 12D illustrates an example Pinterest™ pin 1230 that includes a logo 106 or trademark that identifies a particular brand or product associated with the app, and a first color name 902A, a second color name 902B, and a third color name 902C associated with a color palette. The pin 1230 can include a URL or shortened URL (not shown) as described above for the email 1200 and tweet 1220 respectively.

Referring to FIG. 13, example elements of popup window for displaying song information 1300 for the app are illustrated. The popup window for displaying song information 1300 can include the popup control 810 for expanding or reducing the popup window, the song name 1302, details 1304 about the song, and a hyperlink 1306 to a store for purchasing the song, for example a hyperlink to Apple™ iTunes™. Details 1304 about the song can include song information such as genre, mood, and tempo, as well as other suitable information. In an embodiment, the user can change the song information, similarly to how the song information can be entered in the screen for manually entering a song 500 described above and illustrated in FIG. 5. Other suitable information can be included in the popup window for displaying song information 1300.

Figure 14:
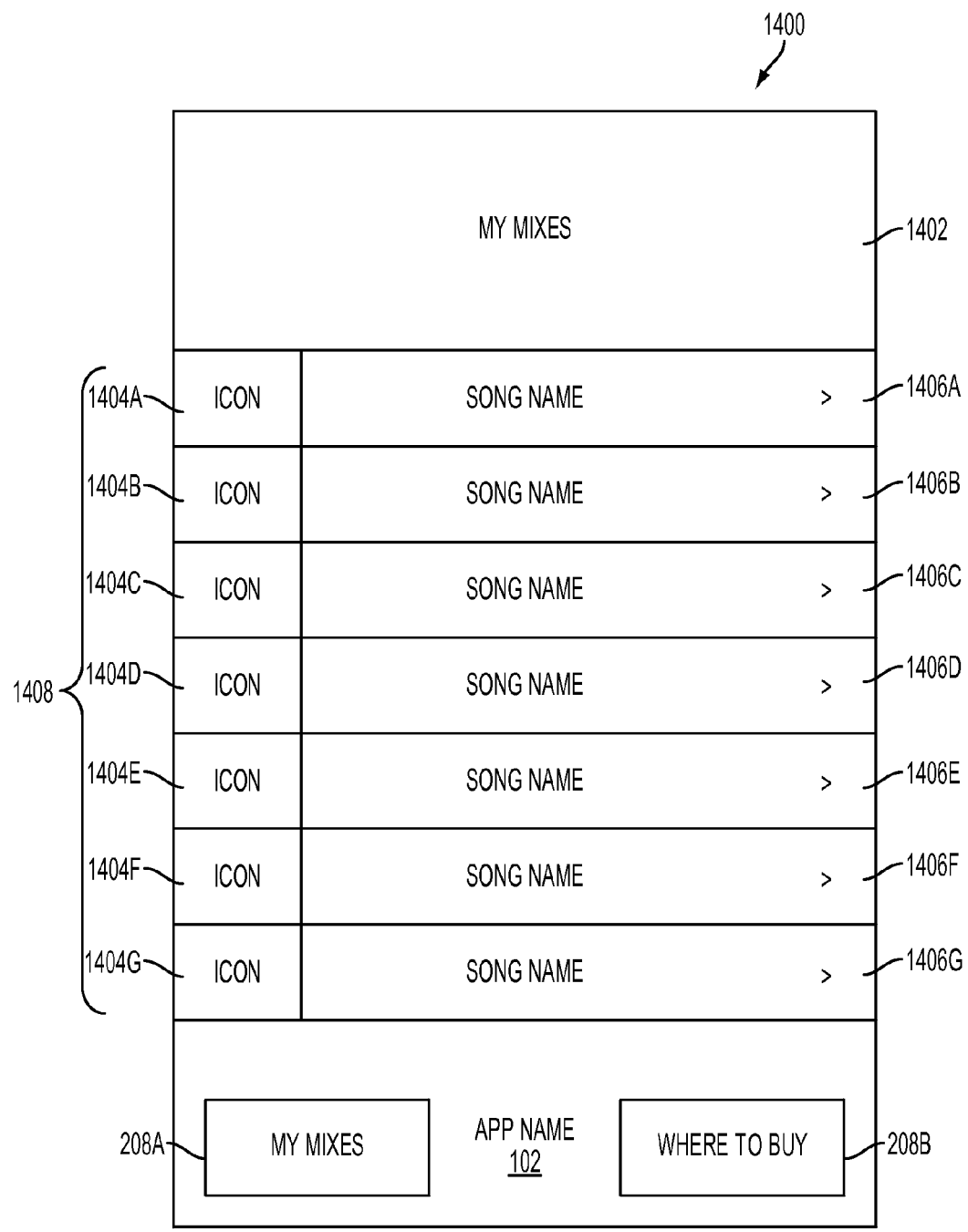
FIG. 14 is a diagram of example elements for displaying saved color palettes.

Referring to FIG. 14, example elements of a screen for displaying saved color palettes 1400 for the app are illustrated. The screen for displaying saved color palettes 1400 can include the app name 102 and application selections buttons 208, as described above for the source selection screen 200 and as illustrated in FIG. 2. The screen for displaying saved color palettes 1400 can include header information 1402, for example header information 1402 that indicates that the user's saved mixes are being displayed. The screen for displaying saved color palettes 1400 can include saved mixes 1408. The mixes 1408 can include songs 1404A, 1404B, 1404C, 1404D, 1404E, 1404F, 1404G (collectively songs 1404) and icons 1406A, 1406B, 1406C, 1406D, 1406E, 1406F, 1406G (collectively icons 1406) associated with each of the songs 1404. The icons 1406 can include artwork associated with a song 1404 or album associated with the song. The icons can include thumbnail illustrations of the color palette associated with the song. In an embodiment, each of the mixes 1408 can be selected. In one embodiment, selecting a song 1404 or icon 1406 causes the app to display the screen for displaying a color palette 800 described above and illustrated in FIG. 8. In another embodiment, selecting a song 1404 or icon 1406 causes the app to display the screen for displaying members of the color palette 900 described above and illustrated in FIG. 9.

Figure 15:
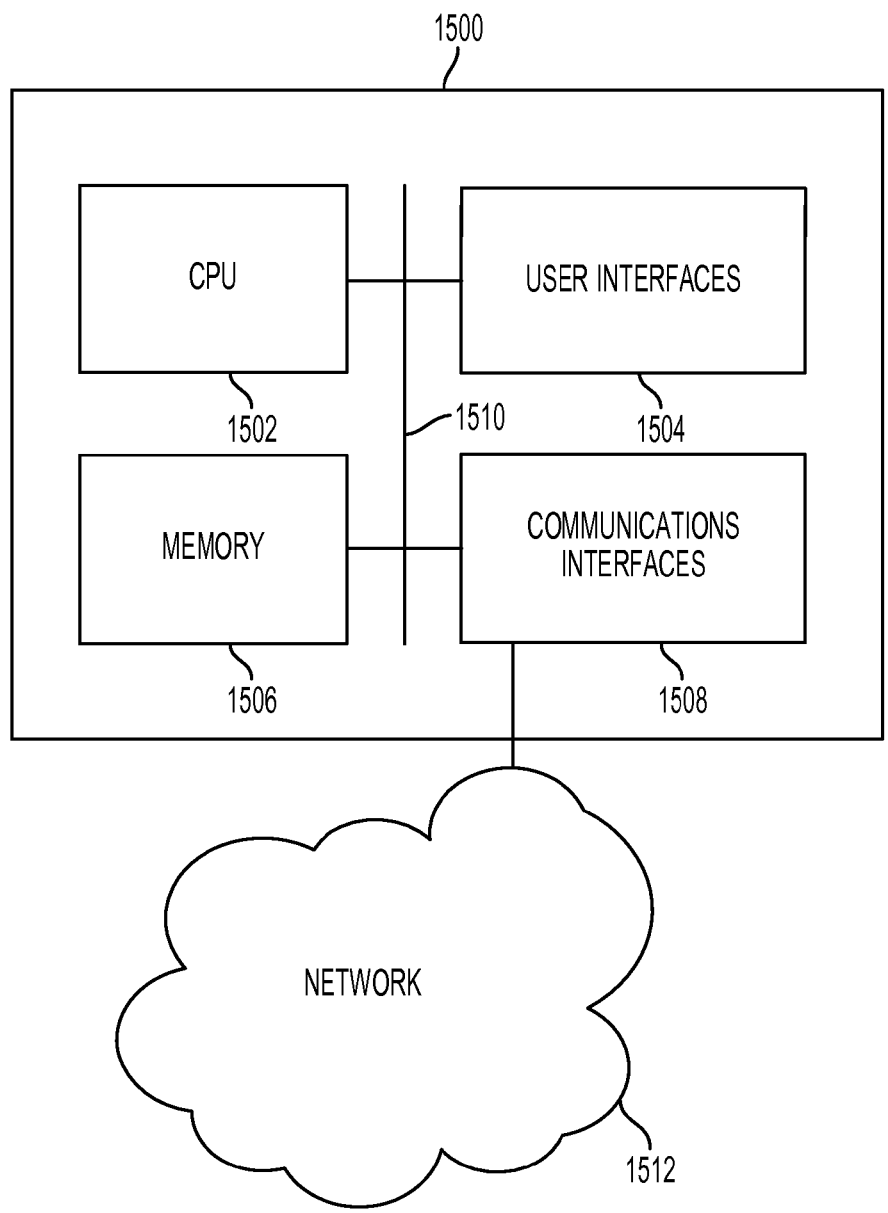
FIG. 15 is a diagram of an exemplary hardware platform.

Referring now to FIG. 15, example elements of an exemplary computing device 1500 are illustrated. A computing device 1500 can be desktop computer, a server, a mobile computing device such as a smartphone, or any other suitable computing device as would be understood in the art. The computing device 1500 includes a processor 1502 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 1500 also includes one or more memories 1506, for example read only memory (ROM), random access memory (RAM), cache memory associated with the processor 1502, or other memories such as dynamic RAM (DRAM), static ram (SRAM), flash memory, a removable memory card or disk, a solid state drive, and so forth. The computing device 1500 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 1502, or memories 1506 are also contemplated as storage devices.

The network and communication interfaces 1508 allow the computing device 1500 to communicate with other devices across a network 1512. The network and communication interfaces 1508 can be an Ethernet interface, a radio interface, a telephony interface, a Universal Serial Bus (USB) interface, or any other suitable communications interface. Example communication interfaces 1508 can includes wired data transmission links such as Ethernet and TCP/IP, as well as PSTN communications links such as T1s (or better), integrated services digital network (ISDN), Digital Subscriber Line (DSL), or dialup modems that implement, for example, the point-to-point protocol (PPP). The communication interface 1508 can include wireless protocols for interfacing with private or public networks 1512. For example, the network and communication interfaces 1508 and protocols can include interfaces for communicating with private wireless networks such as a WiFi network, one of the IEEE 802.11x family of networks, or another suitable wireless network. The network and communication interfaces 1508 can include interfaces and protocols for communicating with public wireless networks 1512, using for example wireless protocols used by cellular network providers, including Code Division Multiple Access (CDMA) and Global System for Mobile Communications (GSM). A computing device 1500 can use network and communication interfaces 1508 to communicate with hardware modules such as a database or data store, or one or more servers or other networked computing resources. Data can be encrypted or protected from unauthorized access.

In various configurations, the computing device 1500 can include a system bus 1510 for interconnecting the various components of the computing device 1500, or the computing device 1500 can be integrated into one or more chips such as programmable logic device or application specific integrated circuit (ASIC). The system bus 1510 can include a memory controller, a local bus, or a peripheral bus for supporting input and output devices 1504, or communication interfaces 1508. Example input and output devices 1504 include keyboards, keypads, gesture or graphical input devices, motion input devices, touchscreen interfaces, displays, audio units, voice recognition units, vibratory devices, computer mice, and any other suitable user interface.

The processor 1502 and memory 1506 can include non-volatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

Figure 16:
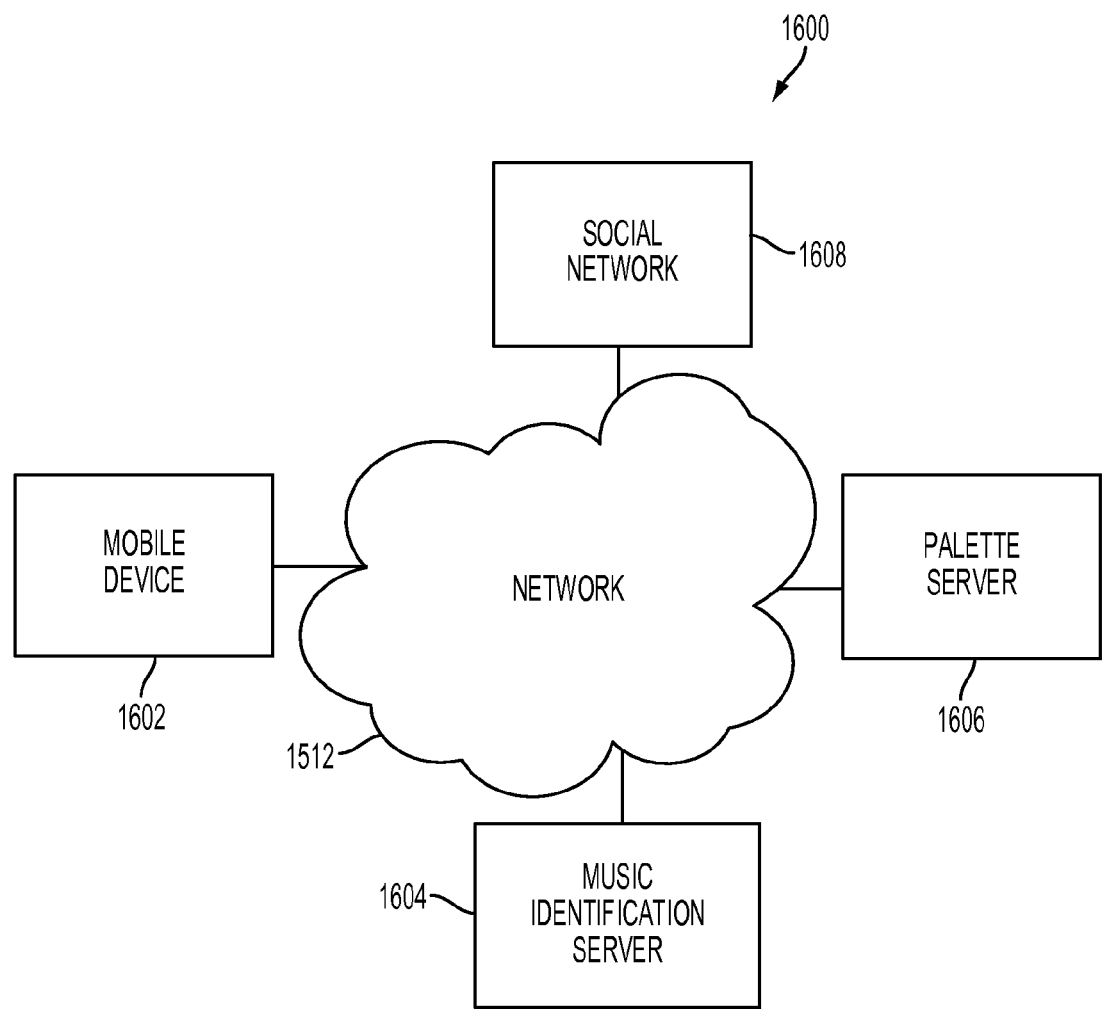
FIG. 16 is a diagram of an exemplary system for generating and displaying color palettes.

Referring now to FIG. 16, a diagram of an exemplary system 1600 for generating and displaying color palette based on a music selection is presented. In the system, a mobile device 1602 can run an application, or app, for generating and displaying a color palette based on a musical selection. The mobile device 1602 can send the name of a song, or sampled music, to a music identification server 1604 across a network 1512, for example the Internet. The music identification server 1604 can receive the song name or sampled music from the mobile device 1604 and send back song information such as genre, mood, and temp, in addition to the song name, if the song name is not known. The mobile device 1602 can send the song information, and also the song name and other information such as user name or characteristics, to the palette server 1606. The palette server 1606 can use the information sent by the mobile device 1602 to determine one or more color palettes that match the information sent by the mobile device 1602. The mobile device 1602 can display one or more of the color palettes and associated songs as mixes as described above for FIGS. 1 through 14. The mobile device 1602 can share one or more of the mixes with other users using social media 1608 by posting or forwarding the mixes to the social media sites. In an embodiment, the mobile device 1602 can determine palettes without using a palette server 1606. In an embodiment, the mobile device can send a song or sample music to the palette server 1606; the palette server 1606 can send the song or sampled music to the music identification server 1604; the music identification server 1604 can send the song information to the palette server 1606; and the palette server 1606 can send color palettes to the mobile device 1602. In an embodiment, the mobile device 1602 can be a desktop system, a laptop, a tablet, a smartphone, or another suitable computing platform, whether mobile or non-mobile.

Figure 17:
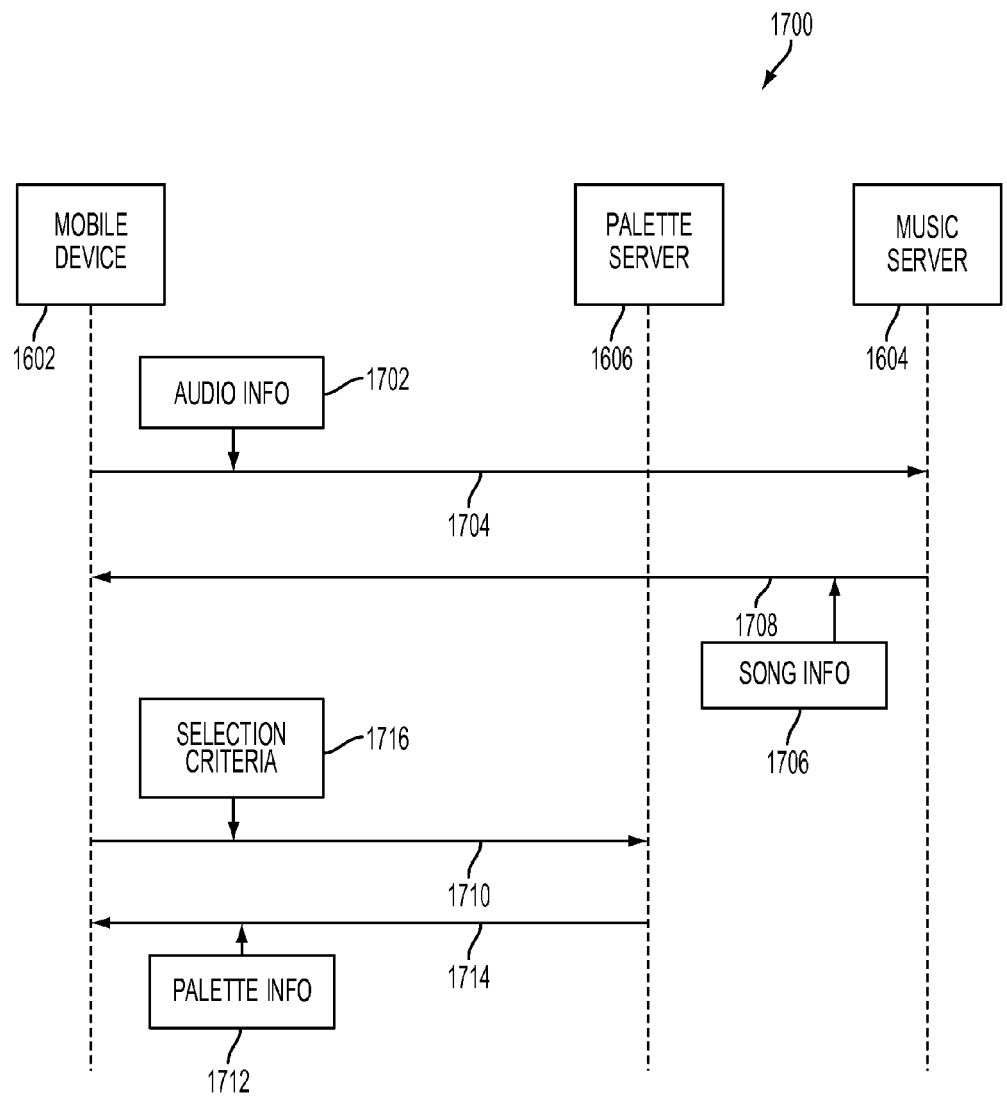
FIG. 17 is a flow diagram of an exemplary process for generating a color palette.

FIG. 17 is a flow diagram of an exemplary process 1700 for generating a color palette. In the exemplary process 1700, a mobile device 1602 that is executing an app, or application, sends audio information 1702, for example sampled music, to a music information server 1604 using a first message 1704 or set of messages. The music information server 1604 sends song information 1706, or song information and the song name, to the mobile device 1602 using a second message 1708 or set of messages. The mobile device 1602 sends the section criteria 1716, for example a subset of the song information 1706, to a palette server 1606 using a third message 1710 or set of messages. The palette server 1606 sends color palette information 1712 to the mobile device 1602 using a fourth message 1714 or set of messages. The mobile device 1602 then displays the mix, or song associated color palette, on the mobile device 1602. In a configuration, the palette server 1606, or corresponding functionality, is present on the mobile device 1602. For example, a palette server 1606 can be a process executing on the mobile device 1602 that is queried by an app executing on the mobile device 1602. In another example, the functionality of a palette server 1606 can be implemented by modules or functions of the app. For example, the functionality of the palette server 1606 can be implemented in a lookup table within the app itself.

Figure 18:
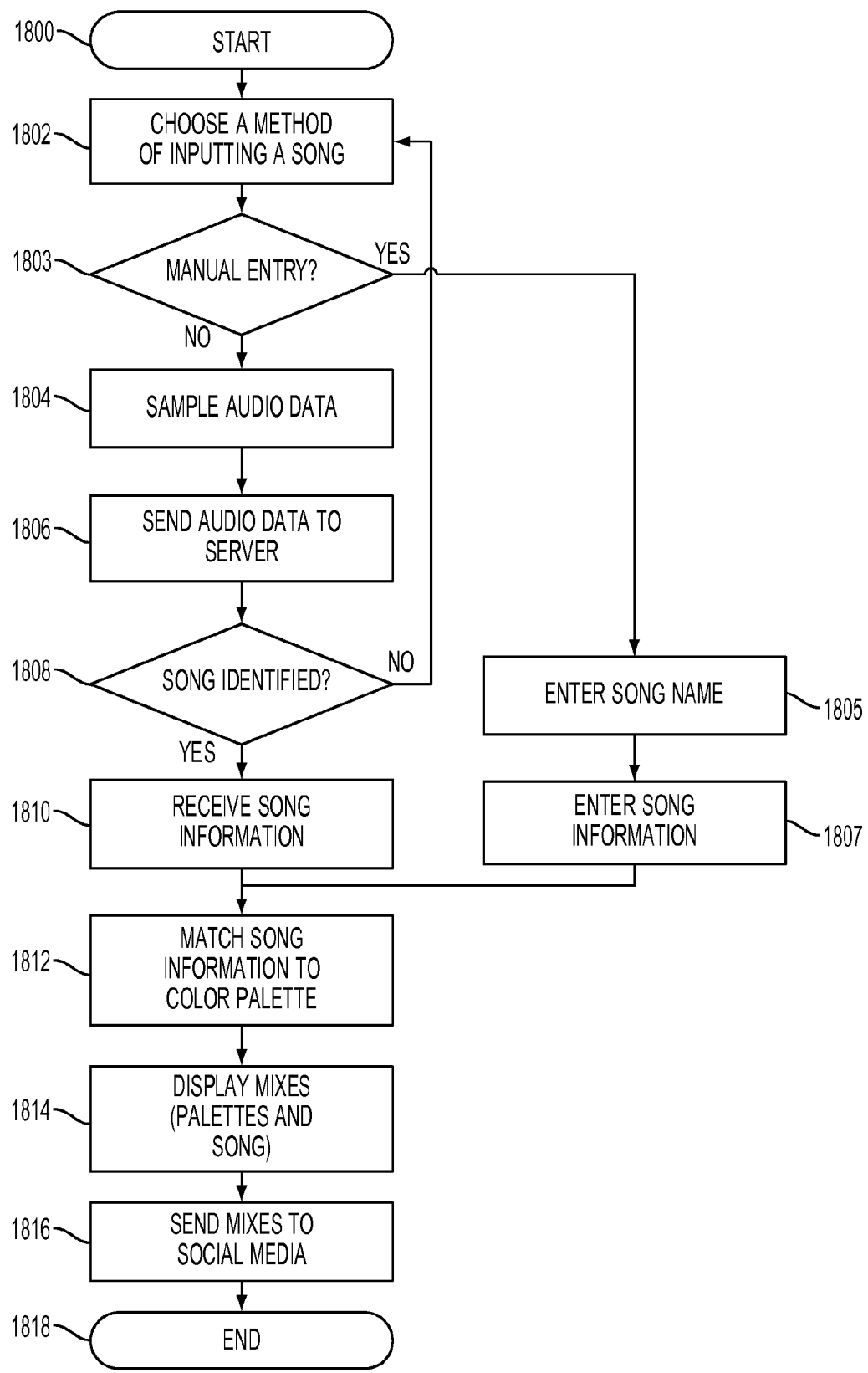
FIG. 18 is a flowchart of an exemplary process for generating and displaying color palettes based on a musical selection.

Referring now to FIG. 18, an exemplary flowchart of the operation of exemplary process for generating and displaying color palettes based on a musical selection is presented. Operation starts with start block 1800 labeled START, where an application for generating and displaying color palettes based on a musical selection begins executing. Processing continues to process block 1802 where a user chooses a method of inputting a song. For example, the user can select that user wants to manually enter the song information or the user can select that the users wants to use sampled audio, for example using the microphone of a mobile device. Processing continues to decision block 1803.

In decision block 1803, if the user selected manual entry of the song information, then processing continues to process block 1805, otherwise processing continues to process block 1804.

In process block 1805, the user enters a name for the song or audio. Processing continues to process block 1807.

In process block 1807, the user enters song information such as the genre, tempo, and mood of the song or audio. The operations of process block 1805 and process block 1807 can be performed in any order. Processing continues to process block 1812.

In process block 1804, the song data is generated, either by accepting an input from the user or by sampling music using the microphone of the mobile device. Processing continues to process block 1806.

In process block 1806, the song data is sent from the application to a music information server. The song data can include the name of the song, or can include sampled music to be identified by the music information server. Processing continues to decision block 1808.

In decision block 1808, if the music identification server can identify the song, then processing continues to process block 1810, otherwise, processing returns to process block 1802 and the user is prompted to input the song data, for example by entering a song name, by manually entering song information, or by resampling the music using the mobile device.

In process block 1810, the music information server sends song information to the application, where the song information can include one or more of the song name, the genre of the song, the mood of the song, and the tempo of the song. Processing continues to process block 1812.

In process block 1812, the application matches one or more color palettes to the song using the song information provided by either the user or the music information server, to create a mix. Processing continues to process block 1814.

In process block 1814, the application displays one or more of the mixes to the user. The user can optionally view multiple mixes and choose a particular mix from the one or more mixes. Processing continues to process block 1816.

In process block 1816, the user can optionally send the mix to other users using social media. For example, the user can send an email, or post the mix to Facebook™, Twitter™, Pinterest™, or another suitable form of social media. Operation then terminates at end block 1818 labeled END.

The above descriptions of various components and methods are intended to illustrate specific examples and describe certain ways of making and using the systems disclosed and described here. These descriptions are neither intended to be nor should be taken as an exhaustive list of the possible ways in which these systems and modules can be made and used. A number of modifications, including substitutions of systems and modules between or among examples and variations among combinations can be made. Those modifications and variations should be apparent to those of ordinary skill in this area after having read this document.

What is claimed is:

1. A computer-implemented method of selecting a color palette based on audio content, comprising:
   sending, to a music information server, media data associated with an audio selection;
   receiving, from the music information server, music information data associated with the media data;
   determining, by a color palette server, a color palette based at least in part on the music information data received from the music information server;
   presenting, on a display of a computing device, the color palette; and
   posting, by the computing device, the color palette onto social media.

2. The computer-implemented method of claim 1, further comprising:
   presenting one or more alternative color palettes;
   receiving a selection of the color palette from the alternative color palettes; and
   associating the color palette with the media data.

3. The computer-implemented method of claim 1, further comprising:
   sampling audio data as the media data.

4. The computer-implemented method of claim 1, further comprising:
   receiving a selection of a song name from a library of songs as the media data.

5. The computer-implemented method of claim 1, further comprising:
   receiving a media selection as the media data, wherein the media selection is selected from the group consisting of an audio stream, an audio clip, a song, a song name, a song lyric, a quote, a music genre, a human voice, a sound effect, a movie stream, and a movie clip.

6. The computer-implemented method of claim 1, wherein the music information data includes at least one music attribute selected from the group consisting of a song name, an artist name, an icon, a length of an audio selection, an indicia of tempo, an indicia of mood, a genre, a subgenre, an indicia of instrument density, an indicia of brightness, an indicia of hardness, an indicia of percussiveness, a key, an indicia of synthecity, and a main instrument, and wherein the determining the color palette is based on at least one music attribute.

7. The computer-implemented method of claim 1, wherein the color palette is selected from the group consisting of a palette that is two coordinated colors, a palette that is three coordinated colors, a palette that comprises four coordinated colors, a palette that is a main color, a trim color, and an accent color, and a palette that comprises a primary color, a secondary color, and a tertiary color.

8. The computer-implemented method of claim 1, wherein determining the color palette includes an operation selected from the group consisting of
   looking up a color palette stored in a lookup table,
   algorithmically determining a color palette,
   deterministically selecting a color palette based on the music information data,
   pseudo-deterministically selecting a color palette based on the music information data, and
   non-deterministically selecting a color palette.

9. A non-transitory computer readable medium having instructions stored thereon that when executed by a processor cause the processor to:
   receive an audio selection;
   send data associated with the audio selection to a music information server;
   receive music information data about the audio selection from the music information server;
   send at least a portion of the music information data to a color palette server;
   receive a color palette from the color palette server;
   display the color palette on a display of a computing device associated with the processor; and
   post the color palette via social media,
   wherein the music information data includes at least one music attribute selected from the group consisting of a song name, an artist name, an icon, a length of an audio selection, an indicia of tempo, an indicia of mood, a genre, a subgenre, an indicia of instrument density, an indicia of brightness, an indicia of hardness, an indicia of percussiveness, a key, an indicia of synthecity, and a main instrument, and
   wherein the color palette selected by the color palette server is based at least in part on the music information data sent to the color palette server.

10. The non-transitory computer readable medium of claim 9, wherein the instructions further cause the processor to:

receive a plurality of color palettes from the color palette server;
display one or more of the color palettes;
receive a color palette selection selected from the one or more color palettes; and
associate the color palette selection with the audio selection.

11. The non-transitory computer readable medium of claim 9, wherein the data associated with the audio selection includes sampled audio data.

12. The non-transitory computer readable medium of claim 11, wherein the sampled audio data is compressed data.

13. The non-transitory computer readable medium of claim 9, wherein the audio selection is selected from the group consisting of an audio stream, an audio clip, a song, a song name, a song lyric, a quote, a music genre, a human voice, a sound effect, a movie stream, and a movie clip.

14. The non-transitory computer readable medium of claim 9, wherein the instructions further cause the processor to:
cause the posting of the color palette and an indicia of the audio selection onto social media.

15. A system, comprising:
a mobile computing device configured to
receive an audio selection,
send data associated with the audio selection to a music information server,
receive music information data about the audio selection from the music information server,
send at least a first portion of the music information data to a color palette server,
receive a color palette from the color palette server,
display the color palette, and
send, via social media, the color palette and one or more of
the audio selection, and
a second portion of the music information data; and
a color palette server configured to
receive, from a mobile computing device, the first portion of the music information data,
select a color palette based at least in part on the first portion of the music information data, and
send the color palette to the mobile computing device.

16. The system of claim 15, wherein the color palette server is further configured to
select a plurality of alternative color palettes, and
send the alternative color palettes to the mobile computing device, and
wherein the mobile computing device is further configured to
receive the plurality of alternative color palettes,
display one or more of the alternative color palettes, and
receive a selection of one of the alternative color palettes as the color palette.

17. The system of claim 15, wherein the audio selection is a song selected from a library of songs on the mobile computing device.

18. The system of claim 15, wherein the mobile computing device includes a microphone input, wherein the audio selection is audio sampled from the microphone input, and wherein the data associated with the audio selection is Message Digest 5 compressed audio data of the sampled audio.

* * * * *